May 19, 1942. E. H. CLARK 2,283,538
TRANSLATING AND RECORDING DEVICE
Filed Aug. 21, 1937 10 Sheets-Sheet 2
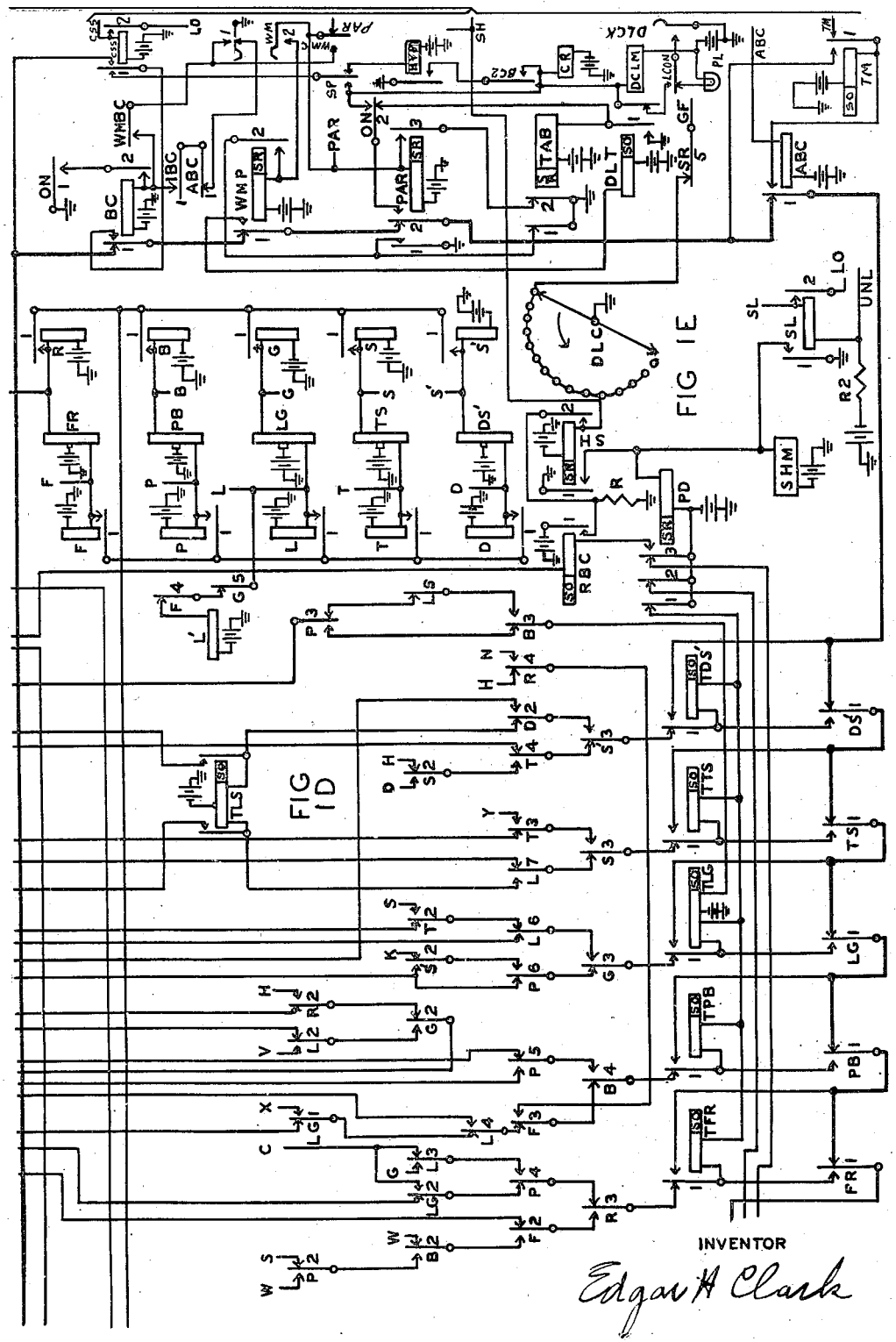
INVENTOR
Edgar H Clark May 19, 1942.   E. H. CLARK   2,283,538
TRANSLATING AND RECORDING DEVICE
Filed Aug. 21, 1937   10 Sheets-Sheet 3
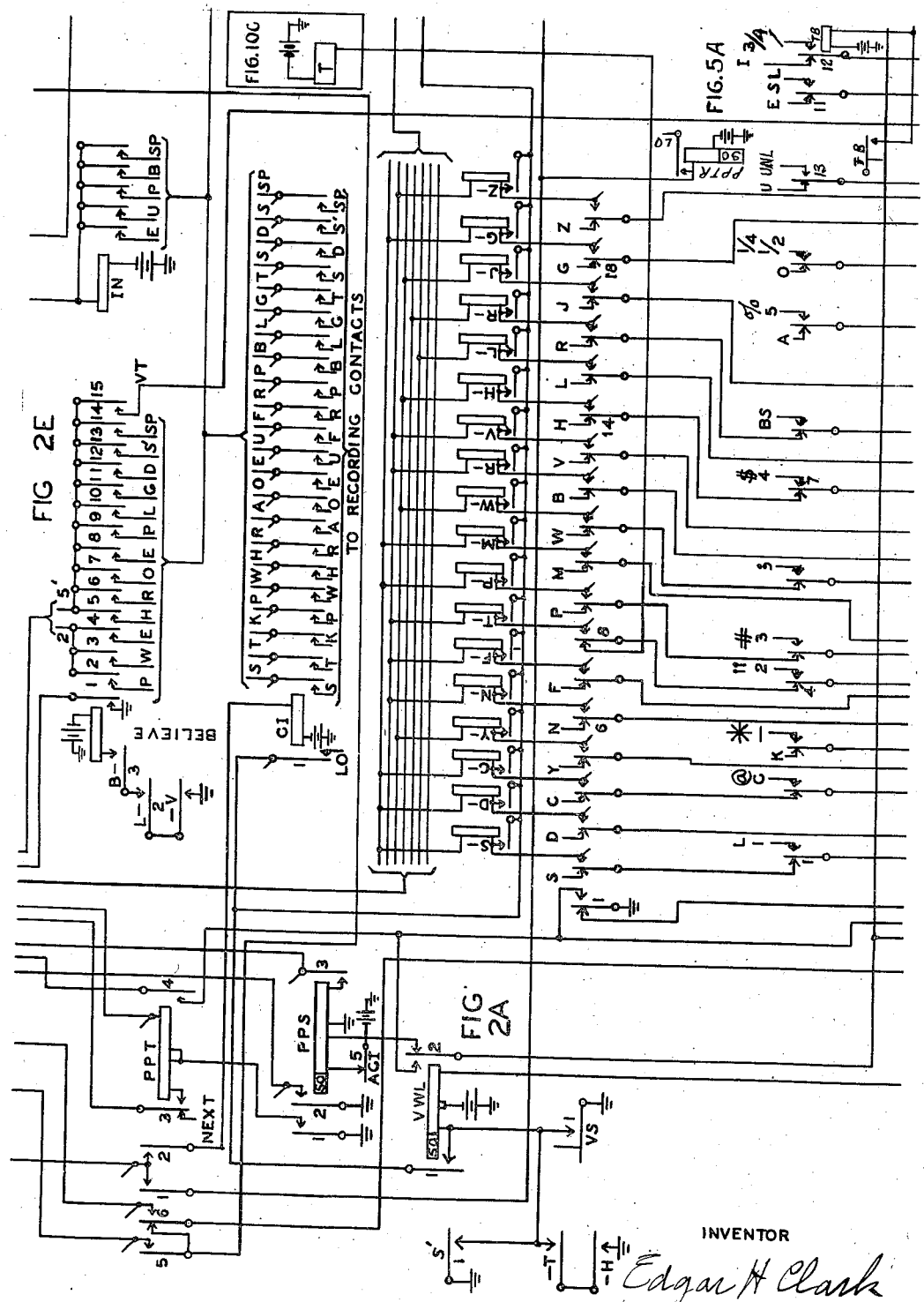

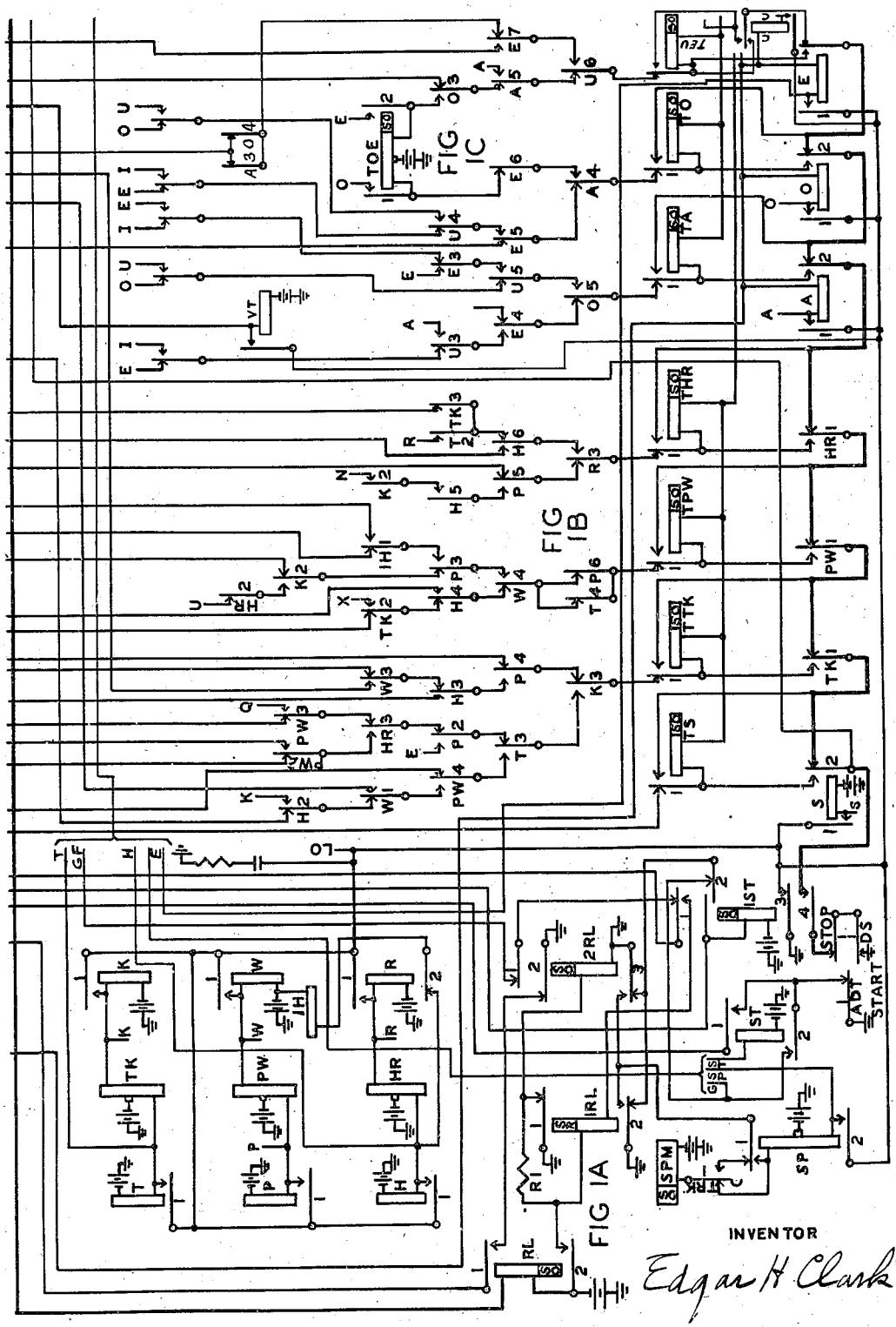

May 19, 1942.    E. H. CLARK    2,283,538
TRANSLATING AND RECORDING DEVICE
Filed Aug. 21, 1937    10 Sheets-Sheet 4
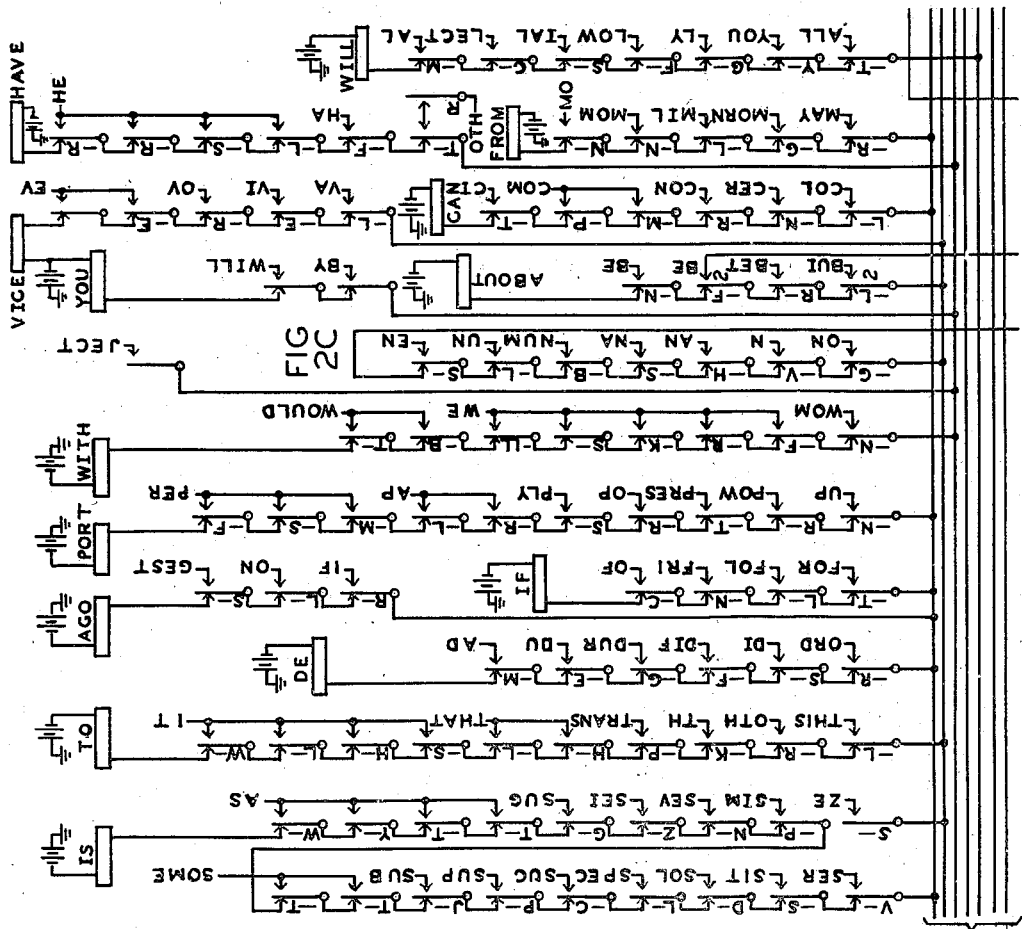
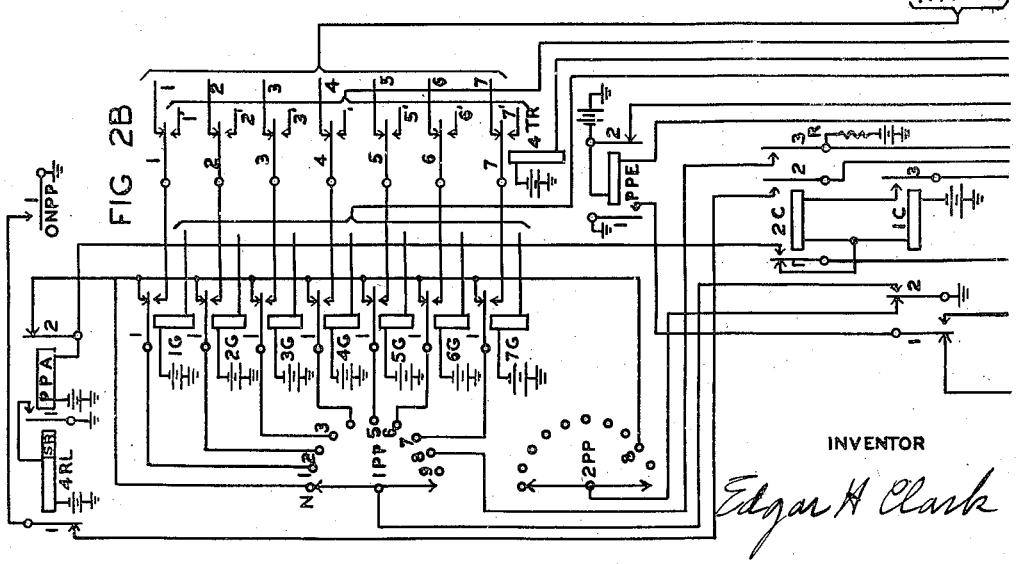
INVENTOR
Edgar H Clark

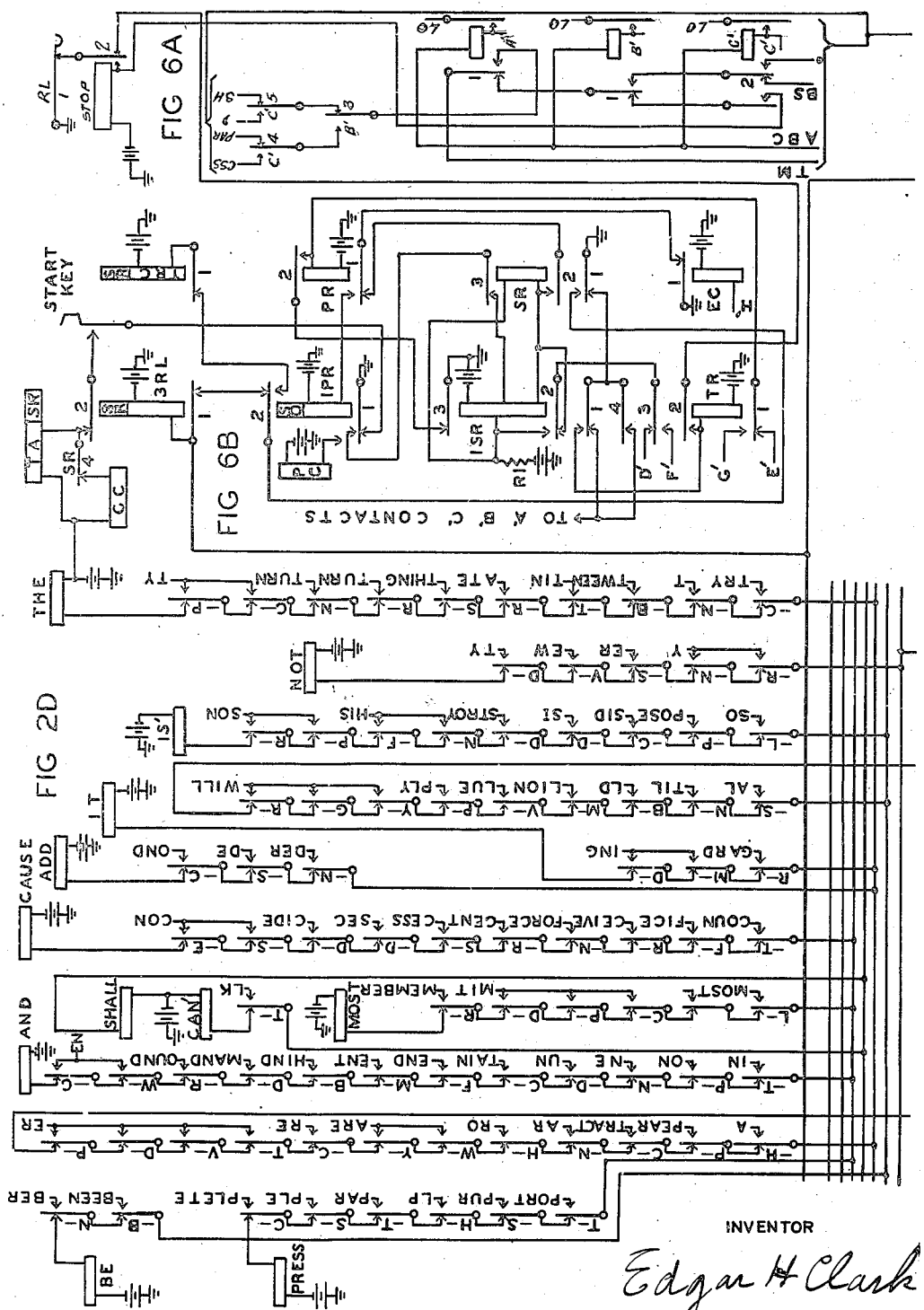

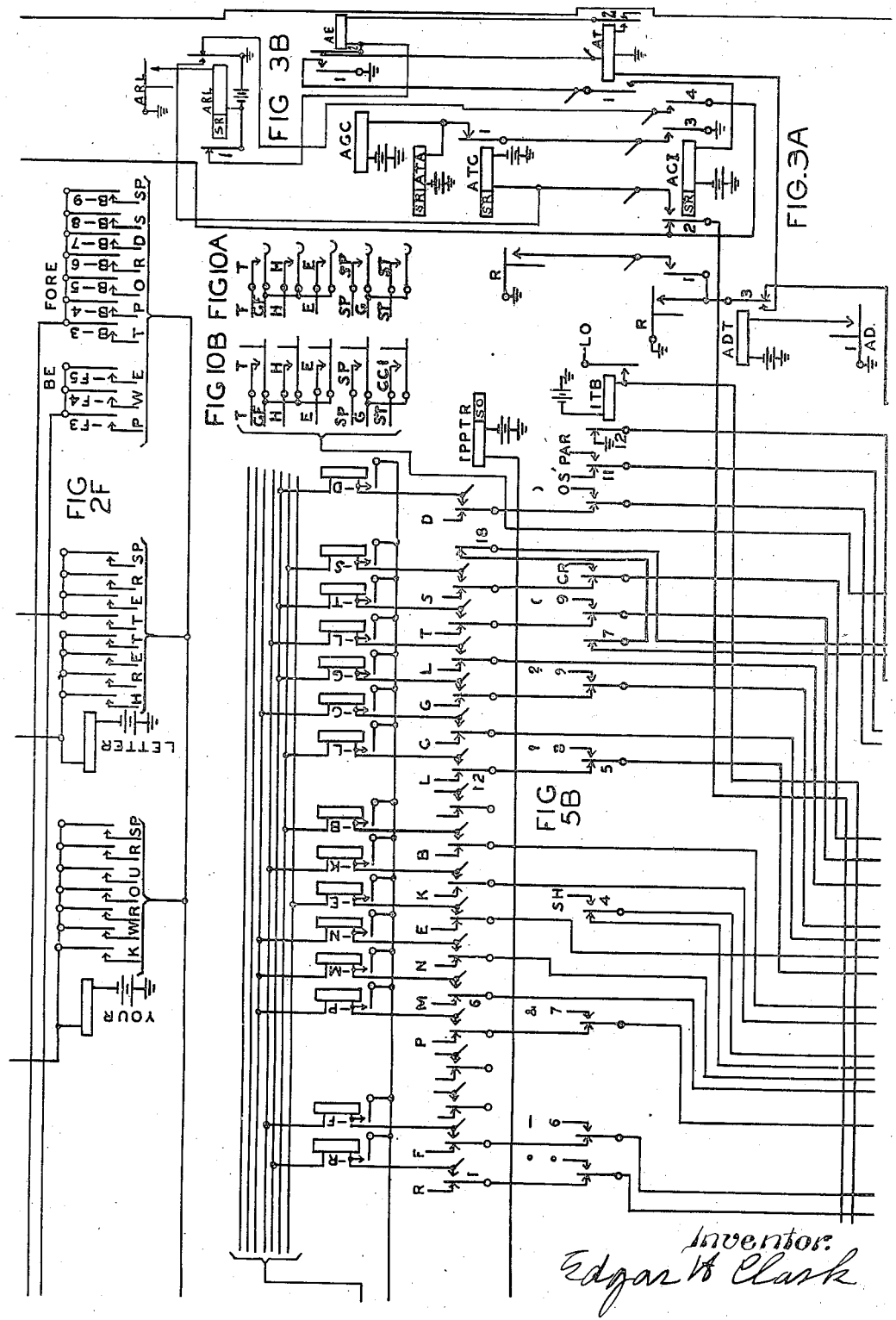

May 19, 1942. E. H. CLARK 2,283,538
TRANSLATING AND RECORDING DEVICE
Filed Aug. 21, 1937 10 Sheets-Sheet 7

| EX | KP |
|----|-----|
| CH | KH |
| CL | KHR |
| V  | PWH |
| GU | KTW |
| EB | KPW |
| Z  | TPW |
| J  | TKP |

| X  | PG  |
|----|-----|
| ST | GT  |
| SY | GTS |
| CK | FBG |
| SK | FRBG |
| NK | PBL |

| FIG 9A | FIG 2B 2C | FIG 2D 6A 6B |
|---|---|---|
| | FIG 2A 2E 5A | FIG 2F 3A 3B 5B |
| | FIG 1A 1B 1C | FIG 1D 1E |

INVENTOR
*Edgar H Clark*

May 19, 1942.　　　　E. H. CLARK　　　　2,283,538
TRANSLATING AND RECORDING DEVICE
Filed Aug. 21, 1937　　　10 Sheets-Sheet 8
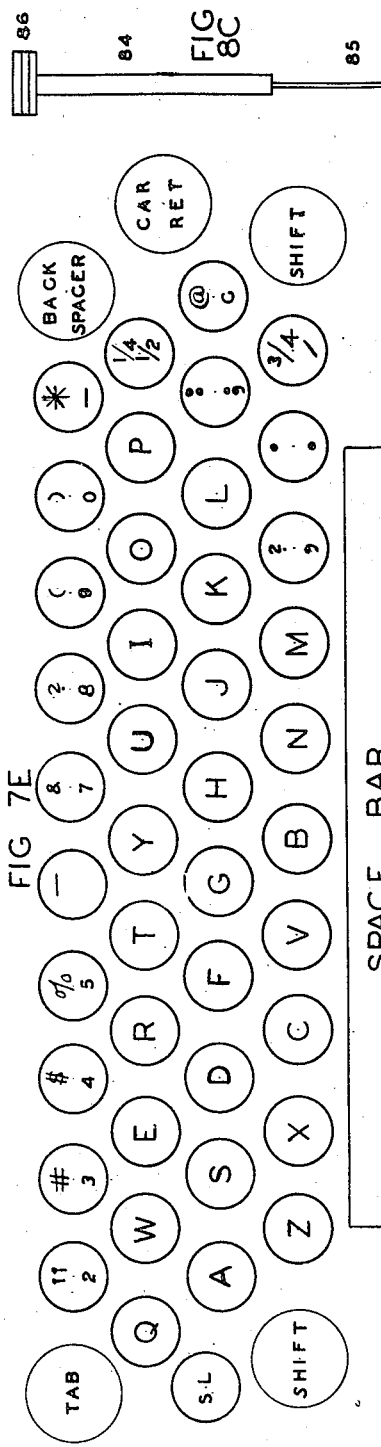
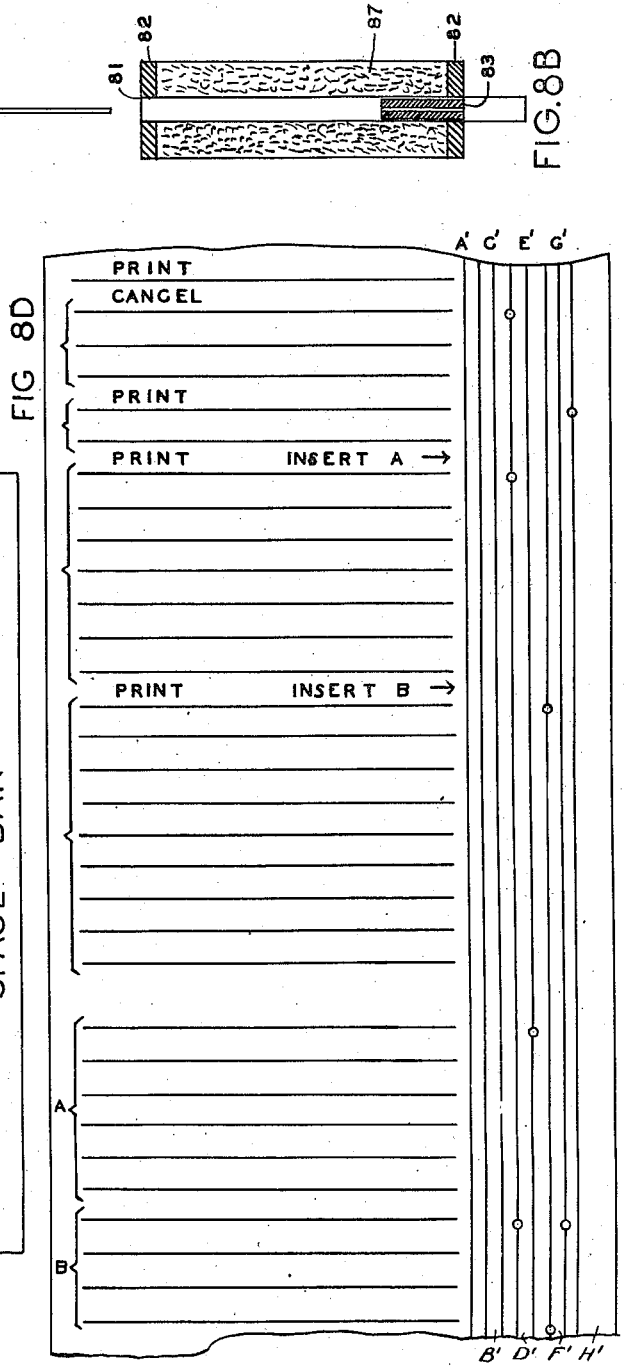

May 19, 1942.  E. H. CLARK  2,283,538
TRANSLATING AND RECORDING DEVICE
Filed Aug. 21, 1937  10 Sheets-Sheet 9
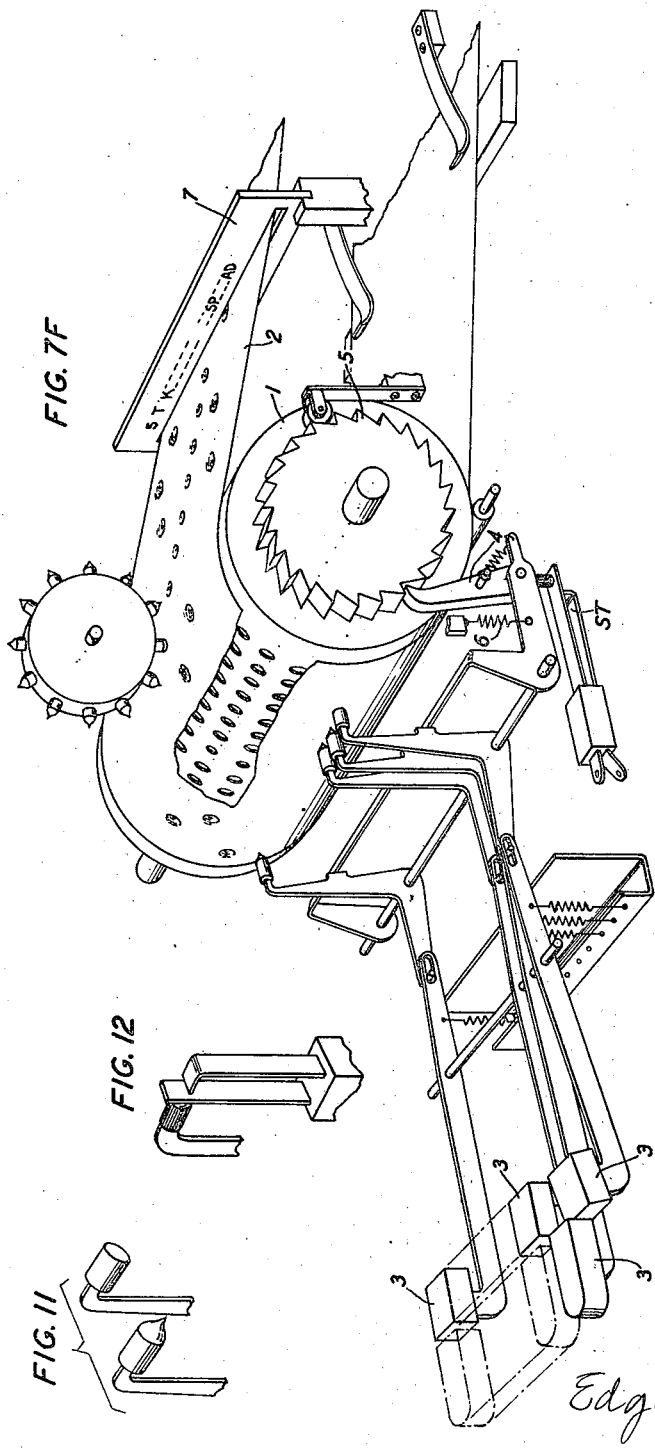
INVENTOR
Edgar H Clark May 19, 1942.  E. H. CLARK  2,283,538
TRANSLATING AND RECORDING DEVICE
Filed Aug. 21, 1937  10 Sheets-Sheet 10

INVENTOR
Edgar H Clark

Patented May 19, 1942

2,283,538

UNITED STATES PATENT OFFICE 2,283,538

TRANSLATING AND RECORDING DEVICE

Edgar H. Clark, Forest Hills, N. Y.

Application August 21, 1937, Serial No. 160,294

16 Claims. (Cl. 197—20)

This invention relates to translating and recording devices and more particularly to those which reproduce a printed record in page form.

In my previous invention covered by U. S. Patent No. 1,913,831 issued June 13, 1933, Serial No. 246,992, I provided improvements over the best known method at that time, which was a commercial machine with a rapid permutation keyboard and means for recording intelligence partly in stenographic code and partly in phonetic spelling, with phrasing, on paper tape in printed form. At another time it is mentally translated translated and printed manually on a standard typewriter. A well-known code-recording device of this character is shown in U. S. Patent No. 1,280,743 to W. S. Ireland, October 8, 1918, and will be referred to in this specification as a code printer.

The improvements provided in Patent No. 1,913,831 consist of controlling a standard typewriter directly from a permutation keyboard, similar to the one mentioned above. This permits of taking dictation at high speed, directly on a typewriter either locally or remotely controlled. The intelligence is passed from the keyboard to the recorder in stenographic code and full spelling. The recorder operates at once to translate and cause a standard typewriter to print automaticaly in page form, thus eliminating the manual process, which represents about two thirds of the operator's work time in connection with the code printer.

The present invention provides improvements upon my previous invention, listed above, by providing a device capable of recording intelligence on tape by means of punched holes, or perforations, and manually controlled from a permutation keyboard similar to the code printer. The record is made partly in stenographic code using full spelling, partly in phrases from abbreviations and partly by phonetic spelling. The principal object therefore is to provide more flexibility by this method of recording to allow for the making of corrections and changes at any time during the dictation or after the dictation has been completed.

A further object is to provide means to transfer the record from the tape to the recorder at another time, and to automatically translate and cause a printed record to be produced in page form, thus permitting of a number of original copies.

A still further object is to place the present invention upon a commercial basis by providing simpler circuits. A combined recorder and translator is provided, and the plurality of recorders are no longer required. It also provides improvements in the method of translation and the timing for the printing impulses. This permits of considerably less current consumption and less maintenance.

A still further object is to make use of the code used in connection with the above-mentioned code printer, so that an operator familiar with that method of operating, using abbreviated spelling, may readily become adapted to the proposed method by using full spelling and operating the space key, as required.

Other objects of the invention and the features by which they may be secured will be apparent from the following general description, detailed description and the appended claims, reference being had to the attached drawings in which—

Fig. 1A shows the relays of the start and release circuit, for the main translator;

Fig. 1B shows the recording and translation relays of the initial consonants;

Fig. 1C shows the recording and translation relays of the vowels;

Fig. 1D shows the recording and translation relays of the final consonants;

Fig. 1E shows a group of relays for obtaining miscellaneous controls;

Fig. 2A shows relays for the start and discriminating circuit for phrasing and phonetic spelling;

Fig. 2B shows relays and a switch used as a common control in connection with phrasing and phonetic spelling;

Fig. 2C shows initial consonant translation contacts for phrasing and phonetic spelling;

Figs. 2E and 2F show recording and translation relays for certain words in connection with phrasing and phonetic spelling;

Fig. 3A shows start and release relays for address translator circuits;

Fig. 3B shows common control relays for address translator circuits;

Figs. 5A and 5B show transfer contacts for the selection of numeral, punctuation and miscellaneous magnets for the control of the printing of the same;

Fig. 6A shows relays for gaining the proper printing control when smaller tape changes are encountered;

Fig. 6B shows relays for gaining the proper printing control when larger tape changes are encountered;

Fig. 7E shows a commercial typewriter keyboard, for direct typing in a well known manner;

Fig. 7F is a perspective view showing a code recording or tape perforating machine for recording the main code;

Fig. 8B shows the construction of a solenoid magnet for electrically operating the typewriter key levers;

Fig. 8C shows the construction of the armature for the solenoid magnet shown in Fig. 8B;

Fig. 8D shows details of the tape perforations for controlling the larger tape changes such as cancellations and insertions;

Fig. 9A shows a key as to the arrangement of the circuits;

Fig. 10A shows key contacts for the direct control of the translator without tape perforations;

Fig. 10B shows tape testing contacts for the control of the translator from a tape record;

Fig. 11 shows at the right, a punch for perforating a clean cut hole in the tape, and at the left for embossing the tape;

Fig. 12 shows a contact for attaching to each key lever for the direct control of the translator as shown in Fig. 10A.

GENERAL DESCRIPTION

Figure 7A:
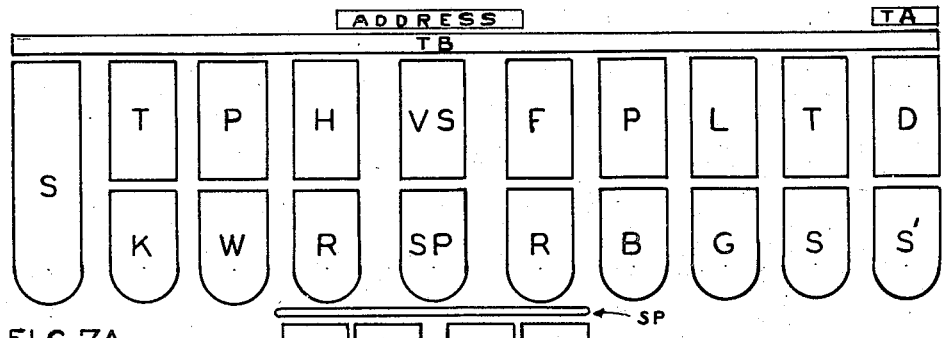
Fig. 7A shows a controlling keyboard for perforating a record tape in code.

This description is for the specific embodiment and is intended not to limit the scope of the invention but rather to facilitate the understanding of the details which follow.

The first operation records dictation in code on tape similar to the code printer, as far as operation is concerned. Instead of a code printer, the proposed machine becomes a code perforator and space is reserved on one side of the tape for corrections or changes.

A reproducing machine or tape advancing device with contacts and feelers or testing elements is provided for transferring the record to the translator.

The translator consists of one register translator, preferably of relays. No storing registers are used as in the previous invention, as none is required. The translator is similar to the previous one except that it is an improved and simplified form. The translation is made immediately after the record is taken and the printing can start at once. A ground is placed on the start lead which weaves through the circuit to pick off the key magnets in the printer in the proper order, and to allow the proper timing of the pulses to assure satisfactory printing.

The typewriter or printing device that is used to illustrate this invention and for reduction to practice, is a commercial machine and will be referred to as a power typewriter. It consists of a power drive roller under the control of a motor and rotating constantly when the current is turned on. The power for printing the letters, etc., is furnished by this roller and is transmitted to a particular lever by means of a cam which is under the control of the corresponding key. The key when operated trips the cam and allows it to engage the roller with a mechanical arrangement shaped like a quadrant of a circle. The periphery engages the roller with a ridged edge and follows the roller for the quadrant of the circle. This small movement is designed to move the type-bar at high speed the full length of the stroke for printing. It provides a hammer blow on the ribbon in front of the paper for printing one character. The quadrant then disengages the roller and is left in an inactive or normal position. Another mechanical quadrant is provided in the opposite half of the circle; this is used for the next stroke. By similar action all controls may be made from the keyboard, including carriage return and shift. The tabular key is designed to move the carriage to the first tabulator position on the first stroke, and to the second position on the second stroke and so on. These positions can be made at any desired points by placing mechanical stops in slots in the rear of the machine. No paragraph key is provided, since the first tabular position may be the paragraph position.

The movement of the keys for tripping the cams is very small and will operate with a very light touch. The power required is so small that the keys can be operated easily by light magnets and hence can be very fast in operating. The printing is effected only once, regardless of how long the key is held operated. After a key has been operated and the character printed, it becomes ineffective and does not prevent a second key from being operated and the second character printed even though the first key is held operated. The key must be released to make the next stroke effective.

This invention is not limited to this sort of typewriter as pneumatic power can be applied to the keys of the usual typewriter by the operation of valves controlled by small magnets. It is not even limited to a typewriter or printing device but may record on any apparatus capable of being operated by an electrical pulse either directly or converted into mechanical motion. The method being used in practice is to attach small solenoid magnets above the keyboard by means of a suitable removable frame. The armatures directly engage the keys and are mounted vertically above. The armatures move downward in response to a pulse of current, and cause the key to trip the cam and cause the type bar to print. The solenoids ad framework being removable, leaves the typewriter free as a unit for adjustments, or it may immediately be replaced by another typewriter. The armatures are provided with flat tops and may be used as a keyboard for the attendant if this method should be used in practice. This represents just one way to attach the magnets. They might be attached from beneath but it is preferable that the typewriter be removable.

The current for the operation of the relays and magnets may be furnished from a storage battery or a dynamotor. The preferable form, however, is some commercial unit of rectifier for converting the commercial alternating current light circuits into twenty-four volts direct current.

Direct keyboard

The translating and recording device could be operated directly from a permutation keyboard instead of from the contacts of the reproducing machine. In this case the circuit to the magnet for rotating the tape is omitted. This is now being done in practice without any storing registers. The printing starts immediately after the keys are operated, and prints at high speed, and the translator is cleared out before the next stroke is operated, even at high speeds. The keys are made ineffective after the record is taken until the translator has cleared. In this manner the first record cannot be changed even though the second stroke follows quickly. If the translator has cleared even a small fraction of a second before the keys of the second stroke have been released, the record can be taken satisfactorily. This smooths out the peaks and provides a plan for a fast typewriter. If a direct keyboard is used commercially, however, one or two simple storing registers would most probably be used to allow for corrections in cases where the wrong keys are operated by mistake.

Noise removal

With the direct keyboard method the typewriter may be remotely controlled as outlined in my Patent No. 1,913,831. This locates the noise at a point distant from the operator. With the tape controlled method, the typewriter may be located at a point where noise is of small consideration. Noiseless typewriters could be used but they have the objection that they do not print as clearly as a machine with the hammering stroke.

Either of the proposed methods will lend itself to the use of standard parts and methods, such as operating methods, printing methods, standard relays and magnets, standard rectifiers, and standard wiring methods. It is an ideal arrangement for a wiring method called surface wiring. This is both inexpensive and satisfactory.

The permutation keyboard shown in Fig. 7A may be operated in several ways, that is, a combination of keys may be operated to select a single character or a plurality of characters. It may also be operated to select a phrase at a single stroke, in which a letter combination of one or more keys may select each word of the phrase. Most words used in phrasing may also be used separately as word translations. Since words may be written with or without translation or in phrases, it may be considered as a triple function keyboard.

The letters S T K P W H R are to be operated by the fingers of the left hand and are known as the initial consonants. The letters A O E U are the vowels and may be operated with the thumbs. The letters F R P B L G T S D S' are the final consonants and are to be operated by the fingers of the right hand. The letters and combinations print left to right and top down and may be simultaneously operated at one stroke. It is this simultaneous operation of the keys, together with having the keys constantly at the finger tips, which makes possible the great speed of the device, and this is obvious when the method is compared with ordinary typing in which the keys are individually operated in succession, and which requires the movement of the hand in part of the cases. The keys are of a non-locking type, that is, the key returns to normal position as soon as the finger pressure is removed.

Figure 7B:
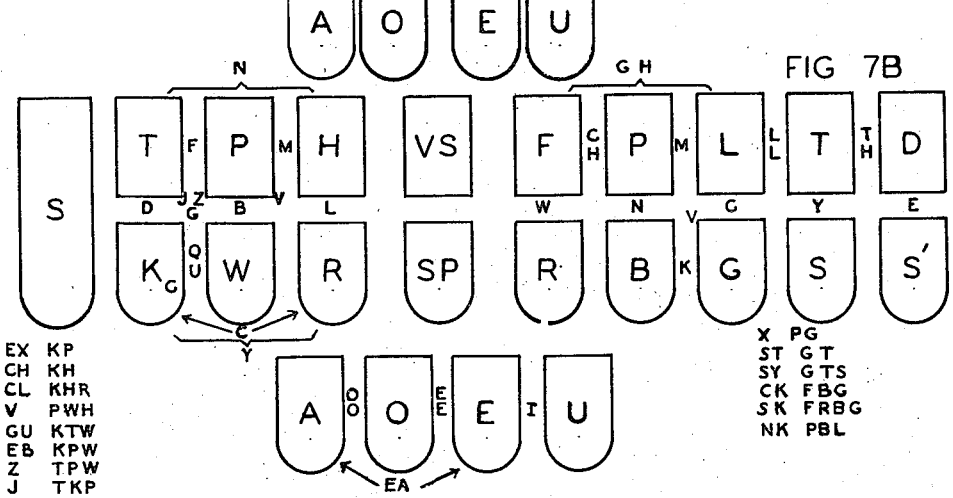
Fig. 7B shows a letter code for the controlling keyboard, with certain modifications and additions for extending its use or for adapting it better to the invention.

The letter combinations shown in Fig. 7B are illustrated by the following: The letter F (initial) may be obtained by a combination of keys T and P operated simultaneously. The letter G is obtained by operating keys T K P W. The letters Q U are obtained by operating keys K W. It is believed that the other key combinations may be readily seen from Fig. 7B. By this method all the combinations are shown at a glance, and provides an excellent method for study. Any word may be selected and spelled out from left to right.

For convenience in operating, two space keys are provided, the one in the center to be operated by a downward stroke with a finger of either hand, and the one adjacent to the vowel keys to be operated by pushing the thumbs forward after a vowel key has been operated. The former is faster and is used when there is an available finger.

For illustration, the word "should" is obtained by operating the letters S and H by two fingers of the left hand, O and U by the thumbs, L and D by two fingers of the right hand, and the space key by moving the thumbs forward. This may all be recorded at a single stroke. This word requires no translation, but a large per cent of the words, however, will require translation either wholly or in part, that is except for phrasing and phonetic spelling, certain letters will require translation.

A word of as many as eight letters may be recorded at a single stroke including the space, for example the word straight. The letters S, T and R are operated by three fingers of the left hand, A with the thumb of the left hand and E U with the thumb of the right hand (E U equals I). The letters F, P, L, T are operated with the four fingers of the right hand in which F, P, L is translated to print G H.

There is no limitation in the manner in which a word may be recorded. It may be divided into one or more letters until it is spelled out as long as the letters read from left to right. The usual method, however, would be to take a stroke per syllable.

A large per cent of the frequently used words may be recorded at a single stroke including the space.

Figure 7C:
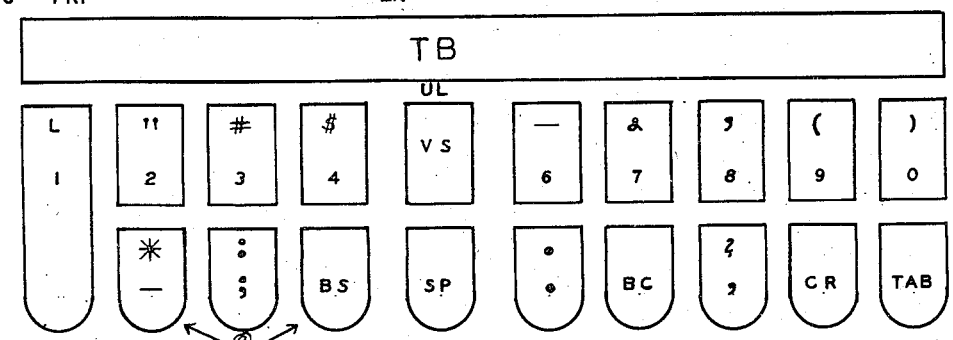
Fig. 7C shows a numerical, punctuation and miscellaneous code for the controlling keyboard, with certain modifications and additions for extending its use or for adapting it better to the invention.

This miscellaneous keyboard combinations are shown in Fig. 7C. These combinations are obtained by operating a regular letter key, or combination of keys simultaneously with the transfer bar. This causes a wire to be transferred from the letter magnet to the magnet of the type bar indicated in Fig. 7C. For example, the letter R (final) when operated with the transfer bar causes a period to be printed. The letter S (final) with the transfer bar will transfer from S to the carriage return magnet. If key H (initial) is operated together with the transfer bar the digit 4 is printed and if the upper case is required, the U C combination is also operated, that is the V S key with the transfer bar. This causes the dollar sign ($) to be printed; the dollar sign and the digit 4 are on the same key, the dollar sign being on the upper case, as shown in Fig. 7C. The digit 3 and the number sign (#) are on the same key, and so on. From this it is believed that the other combinations will be evident from Fig. 7C. This also is a simple method of showing all miscellaneous combinations, and in a convenient form for study.

Tape changes

Provision is made for making changes or corrections on the tape. During dictation the operator indicates changes, if any, in pencil as on the present code printers. After the dictation has been completed an attendant makes corresponding changes by punching holes in the edge of the tape on an auxiliary machine.

The operator may read back to the dictator during dictation by moving the tape through an indicating device similar to a template, through which the tape rides after being printed, as shown in Fig. 7F.

For small detail changes such as the addition of punctuation, space, back space, begin capital or paragraph, rows are provided in the tape in which one hole or a combination of holes may be punched in the edge of the tape where a correction is desired. The code punched selects the particular detail that should be added. For illustration, if the space key were operated in error in the middle of a word, a back space could be added by making punches in the proper combinations. In case it becomes necessary to change a comma to a period or any change of a similar nature, the comma may be canceled by a sticker and a period inserted by the proper punching of holes in the edge of the tape.

In the case of larger changes such as cancelations or insertions, other rows are provided in which holes may be punched in the proper combinations to accomplish any desired change.

In case it is necessary to make an insertion, the part to be inserted is recorded on the tape at a point following the dictation already made. By making the proper punches in the edge of the tape, the reproducer will be directed to skip all printing and move to a point where the insertion is to be made, and then to start the printing. After the insertion the machine will be directed to rotate the tape backward to the point where the printing was skipped, and the regular printing is resumed.

A proof copy may show that certain combinations may have been operated in error. In this case, the attendant may, by means of an auxiliary machine, supply any holes that are missing, or by means of stickers may cover any holes punched in error.

My previous invention showed an arrangement for moving to the new page position automatically. Since there is nothing further to explain on that feature, it is assumed in the present invention that an attendant will place the paper in the printing machine each time a new page is required. When the end of one page is reached a signal will be given.

Phrasing and phonetic spelling

Provision is made for phrasing and phonetic spelling to a certain degree and is considered as illustrative only and not a complete engineering job. The codes may be assigned in substantially the same way as for the code printers, there being the difference, however, that no vowels are assigned in the proposed method. This method is used so that the translator may discriminate full spelling from phrasing and phonetic spelling. Since every syllable, or nearly every syllable, contains a vowel, and the above assignments are made without the operation of a vowel, the translator can immediately discriminate and get set accordingly. A phrase always consists of two or more letter combinations, while the phonetic spelling for a complete word may consist of one or more letter combinations. The word may be one used in phrasing or it may be a different one and contain an indefinite number of syllables. Both are assigned in the order of importance.

Address

Any frequently used addresses may be recorded on auxiliary tapes and placed on auxiliary machines similar to the regular reproducing machines. Any suitable significant letter may be assigned for these addresses and may be individual for different places of business. The dictator may announce the address in the abbreviated form such as "Address R" as illustrated. The operator merely operates the R key (final) together with the address key and conserves time for both the dictator and operator.

Wide margins

In the case of brief letters, typists sometimes leave a wide margin on each side of the page to improve the appearance. Provision is made for this to be done automatically by operating the wide margin key before the printing is started.

Automatic word spacing

The T R K key may be operated before beginning operations, and the space will be inserted automatically at the end of all one-stroke words. This, however, does not eliminate all action regarding the space key on the part of the operator, it merely reduces the number of operations. Since with this plan the number of space operations that would be required is greatly in excess of the number of space cancelations, the process may be reversed if desired, that is, the space key may be used as a space cancelation key for words requiring more than one stroke. The only apparent objection is psychological.

A plurality of original copies may be produced from the tape record either one at a time or a plurality at a time, by connecting the key magnets in multiple.

For a more ready understanding of the invention a detailed description is given hereinafter of a specific embodiment of the invention which is illustrated in the attached drawings. The system of this embodiment may be divided into groups and subgroups shown in the drawings as follows:

Main translator circuits

Fig. 1A—Start and release.
Fig. 1B—Initial consonants.
Fig. 1C—Vowels.
Fig. 1D—Final consonants.
Fig. 1E—Miscellaneous.

Phrasing and phonetic spelling circuits

Fig. 2A—Start and release.
Fig. 2B—Common control.
Fig. 2C—Initial consonants.
Fig. 2D—Final consonants.
Figs. 2E and 2F—Illustrations.

Address translator circuits

Fig. 3A—Start and release.
Fig. 3B—Common control.

Numeral, punctuation and miscellaneous circuits

Figs. 5A and 5B—Transfer circuits.

Tape change translations

Fig. 6A—Smaller changes.
Fig. 6B—Cancellations and insertions.

Keyboard and associated combinations

Figure 7D:
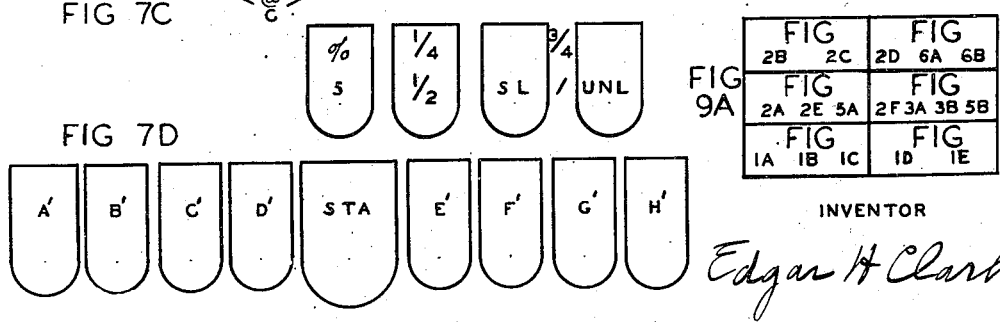
Fig. 7D shows an auxiliary controlling keyboard, for perforating an auxiliary code on one edge of the tape for the automatic control of certain changes to be made in the main code.

Fig. 7A—Permutation keyboard.
Fig. 7B—Code for letter translation.
Fig. 7C—Code for numeral, punctuation and miscellaneous.
Fig. 7D—Auxiliary keyboard for tape changes.
Fig. 7E—Typewriter keyboard.
Fig. 7F—Recording machine or code perforator for making a record in code on the record tape in successive transverse register spaces, the perforations being spaced different predetermined distances from one edge of the tape.
Fig. 11—Clean cut punch.
Fig. 12—Keyboard contact.

Reproducing apparatus

Figure 8A:
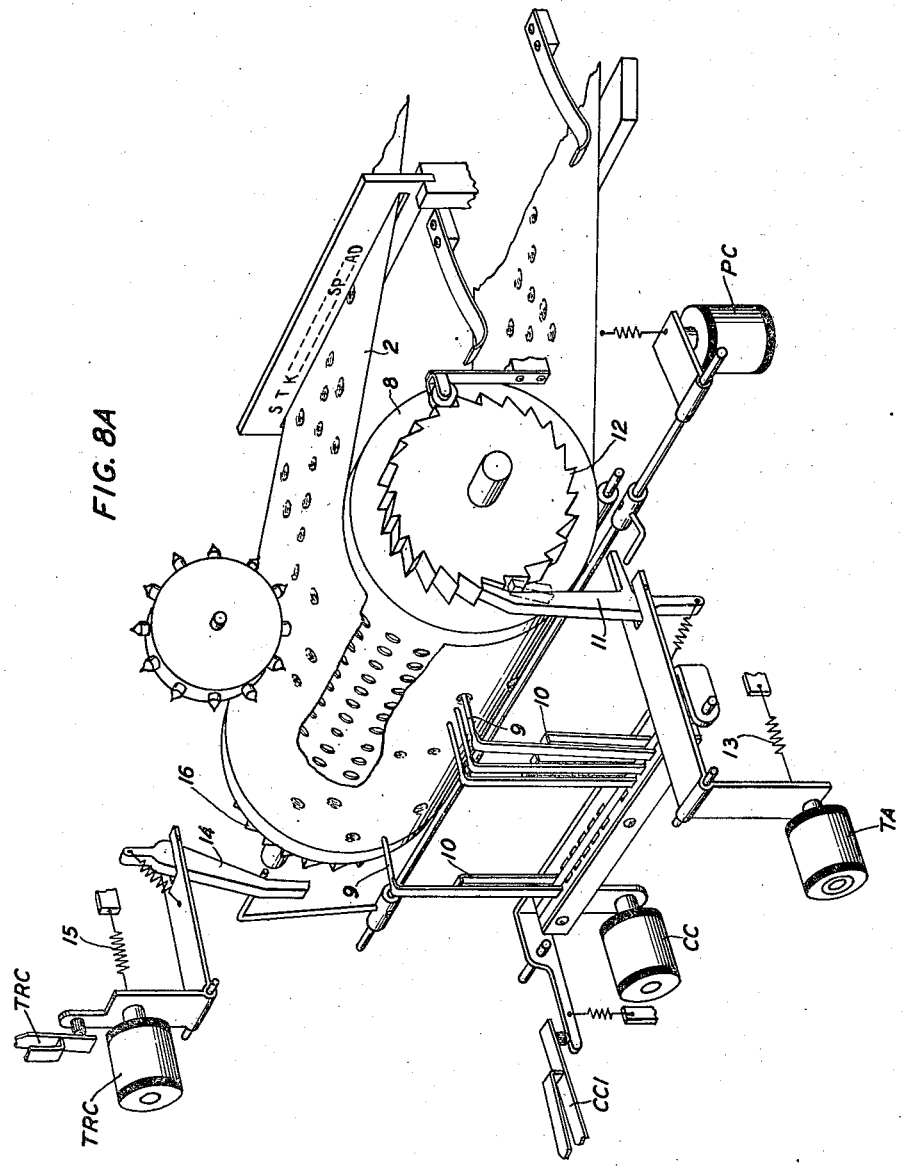
Fig. 8A shows a tape controlling device for advancing and testing the successive records in the tape.

Fig. 8A—Controlling device for advancing and testing the successive records.
Fig. 8B—Solenoid section.
Fig. 8C—Solenoid armature.
Fig. 8D—Details of cancellations and insertions.

Key

Fig. 9A—Key to circuits.

For convenience in studying the system the various elements shown in the drawing and referred to in the corresponding description have been given the following

Designations

SR slow release.
SO slow operate.
ST start.
RL release.
TTK etc. timing printing for T and K etc.
TOE time OO and EE.
SP space.
TLS time LL and SS.
SPM space magnet.
CSS cancel split syllable.
SH shift.
SHM shift magnet.
BF battery feed.
SL shift lock.
PD printing delay.
RBC release begin capital.
PAR paragraph.
TAB tabular.
DL delay tabular.
DLCM double line counter magnet.
DLC double line counter.
CR carriage return.
DLCK double line counter key.
ADT address transfer.
ATA address tape advance.
ATC address tape control.
ARL address release.
TA tape advance.
TM timing.
DS delay start.
PL page lamp.
HYP hyphen.
WM wide margins.
WMC wide margin contact.
DCR delay carriage return.
BC bell contact.
UNL unlock.
C counting.
TB transfer bar.
LO lock.
PHA phrase advance.
GF group feed.
PE phrase end.
G group.
PPE phrase and phonetic end.
PH phrase.
PPS phrase and phonetic start.
PPTR phrase and phonetic transfer.
PPT phrase and phonetic turn.
CI cut in.
AT address turn.
ACI address cut in.
AE address end.
UC upper case.
VS vowel substitute.
VT vowel transfer.
CC contact control.
TRK transfer key.
PC pawl control.
ACC address contact control.

DETAIL DESCRIPTION

The primary registering device or code perforator shown in Fig. 7F, consists of a metallic cylinder 1 over which a tape 2 rides. The cylinder has rows of holes, one hole in each row for each recording key 3. The keys are arranged as shown in Fig. 7A, and constitute a keyboard. Each key by means of levers moves a metallic point into the hole immediately in front. The point may be larger than the hole and rather blunt, and when operated makes an embossing which may also have a perforation. It is not limited to embossing, inasmuch as clean cut holes can be punched. The embossed holes, however, require less power as the load is applied gradually rather than all at once. This is advantageous from an operating standpoint. The perforating point may take the most convenient form; for example, to facilitate the operator's work it may be designed with a rather sharp point to start a hole in the paper after which the work may easily be completed by a rather blunt shaft slightly larger than the hole with an angle to prevent sticking. As one or more keys are operated a ratchet 4 engages a toothed wheel 5 so that when the keys are released the cylinder is operated one step under the power of spring 6 to advance the tape, and bring the next row of holes opposite the perforating points.

The amount of movement of these keys in practice is about five-eighths of an inch and the movement required of the point to punch the hole is considerably less, thus providing plenty of leverage to furnish the power without the use of a motor or any hammering action. The above permits of a lightweight construction thus making it easily portable.

The operator may read back to the dictator by drawing the tape through a template 7 which provides letters corresponding to the keys at the proper points to indicate to the operator the designations corresponding to the holes.

The alternative punches for clean-cut holes are shown in Fig. 11. In case clean-cut holes are used it will be necessary to furnish a row of guide holes.

In addition to the above keys for tape perforating, a blank key TA is furnished as shown in Fig. 7A. Its purpose is to advance the tape without leaving a record, for use such as marking the end of a letter in which an insertion is to be made as shown in Fig. 8D which will be described later. It will have very little use.

The tape consists of a long strip of suitable paper or other suitable material arranged in any convenient form for feeding. In order to render the claims more definite, a code record is defined as a transverse row on the tape on which may be recorded a code designation of one or more symbol impressions representing a word, syllable, phrase or address, and modifying designations as required. This provides a code storing means, capable of being read mechanically. A strip of tape therefore consists of a plurality of successive code records.

The secondary code perforator is similar to the primary code perforator described above, except that it is provided with keys, as shown in Fig. 7D, in addition to the regular keys shown in Fig. 7A, to form a secondary keyboard. The keys shown in Fig. 7A are for use in case a perforation is missing or if the attendant wishes to make an addition. The keys in Fig. 7D are for superimposing code designations to modify the regular tape record.

Fig. 8A shows a tape advancing and code reading device which provides transfer means for transferring the tape code record to the translating device. It consists of a metallic cylinder 8, with rows of holes similar to the one for the code perforator. The tape is placed in the proper position on the cylinder, the embossings serving as guide holes, in addition to any guide holes which may be furnished. The CC magnet is operated by a key. This causes feelers or testing elements 9 to be moved against or through the tape depending on whether or not they find a hole in the tape. The feelers are made small enough to allow for the embossing and control contacts 10 which furnish a circuit in each case where a perforation is encountered. The magnet CC also operates a common start contact CC1. TA is operated simultaneously with CC and causes a pawl 11 to engage a toothed wheel 12. At a time when the record of the next row is to be transferred the CC and TA magnets are released and the cylinder takes a step forward under the power of spring 13. This operates repeatedly under the control of the translator. This method conserves wear on the tape. In the case of an insertion it is necessary to cause the tape to recede to the proper point. In this case PC is operated to render pawl 11 ineffective and render pawl 14 effective, on toothed wheel 16. The cylinder may now be rotated backward by means of magnet TRC through its own contact under the control of the translator and under the power of spring 15. To again rotate forward the translator releases magnet PC.

The secondary tape advancing and code reading device is similar to the primary device adapted to receive and repeatedly use an endless set of code records on which is previously recorded any frequently used address. The translating device selects and directs the device to transfer the record in code combinations to the translating device as described later.

The solenoid magnet for operating the typewriter keys or character printing elements, is shown in the form of a section in Fig. 8B. It consists of a brass tube 81 with fiber ends 82 to form a spool on which insulated wire 87 is wound. To increase the efficiency a soft iron plug 83, with a longitudinal hole is inserted. The armature is shown in Fig. 8C. It consists of a soft iron rod 84, a brass pin 85 and copper washers 86. The armature is inserted in the coil and set above the associated key with the proper spacing to allow the armature to be drawn down far enough to operate the type bar but still not touch the iron core. The copper washers serve as key tops and also prevent too much overthrow, as in the case of a double letter.

The recording device, or printing device, consists of a power drive typewriter previously described. It may preferably be of the Remington Electric type Model No. 80 as used in reduction to practice, or it may be an International Electric Writing Machine (Electromatic). The attendant and the printing devices may be located at a point where noise is of least consideration, also where floor space is less expensive.

A word of explanation is given regarding the circuit drawings because they are slightly different, that is, they embody a combination of several usual methods. The object is to keep the leads short to clarify the circuit and description. A designation within a coil indicates a magnet and adjacent, indicates a relay. SR indicates slow release, SO indicates slow operate. The springs associated with a coil may be located in the same row as the coil, in which case the swinging spring will bear a number only. Some of the springs may not be located in the same row in which case the swinging spring will bear a number and also the designation of the coil to identify it. Like designations on leads mean they are connected. Contacts on the tape reading device are shown on the circuit to represent a tape feeler. As previously described, the tape is placed in the proper position on the tape reading device and the start key, Fig. 6B, is operated. This operates CC through SR4, 3RL2, start key, 1PR1. Also TA through 3RL2, start key, 1PR1. As previously described this transfers the record of the first row to the translator and closes the start contact CC1.

As in my previous patent the words "the gem" are to be printed since they illustrate spelling in non-code and code. Including the spacing, these words require eight strokes on an ordinary typewriter. In this system, they may be recorded in two strokes. The first stroke includes the space and letters THE. The symbols representing these letters are considered as single symbols. The second stroke includes the space and the letters T K P W E P L in which T K P W equals G (initial) and P L equals M (final). The symbols representing these letters are considered as compound symbols. The first row of the tape record causes the operation of T and T K relays, or consonant code receiving elements or units, in parallel through the T lead, bracket lead, T lead, T tape feeler contact Fig. 10A, GF lead, bracket lead, GF lead, 2RL1, 1ST1, PPTR1. H and HR operate over the H lead through a similar circuit through the H tape feeler contact. VWL and E relay or vowel code receiving element or unit, operate in series over a similar circuit over the E lead and tape feeler contact E. VWL is a discriminating relay or code discriminating means, which if it operates allows the circuit to proceed with full spelling, and as will be described later under phrasing and phonetic spelling, and if it is not operated, the circuit proceeds to select a secondary recording and translating device. SP operates over the lower winding through lead SP, two bracket leads, SP lead, SP tape contact, G lead, two bracket leads, G lead, 1ST2, 1RL2. ST operates over lead ST, two bracket leads, ST lead, CC1 contact, G lead, two bracket leads, G lead, 1ST2, 1KL2. The recording relays lock through obvious circuits to 1ST3. Any locking circuit designated L0 locks to a branch designated L0 to contact 1ST3. In practice the load would be split and carried on more than one contact. 1ST is slow operate to allow the translator to get set, after which the printing is ready to start. The start ground, Fig. 1, is extended to operate magnet T through DSI, STOPI, IST4, S2, TKI, TTKI, K3, P4, TB4, PPTR8, magnet T. The circuit just traced through TKI, TTKI, K3, P4, TB4, PPTRS, magnet T, represents a character setting unit or link. It is selected by the setting of the code receiving elements in accordance with the code requirements. The contact TKI in the above circuit represents a switching link in a sequence chain arrangement. The contact when moved to its alternate position transfers the printing control from the through position to a selected associated character setting link. Contact TKI when operated transfers the printing control from contact PWI to contact TTKI to select the character setting for the character T. The consonant code receiving elements together with their character settings referred to above constitute a consonant translating field. The consonant translating field together with the vowel translating field is defined as a character translating field. The set of contacts, such as K3, of any one code receiving unit or relay in the translator represent a translator element which is selectively set in one of two positions in response to the presence or absence of a symbol impression in the code record being tested by the tape advancing device. The individual contacts of such a translator element may be looked upon as symbol identifying means, since such a contact, usually in combination with other similar contacts on other translator elements, identifies the particular symbol recorded in the code record being tested and contributes to the translation of such a symbol by setting up the circuit condition or character setting in the translator by which a character setting circuit or unit is made operative or completed for in due course selecting a corresponding character printing element in the printing device. It should of course be understood that the number of contacts on the different translator elements and their order and alignments with contacts on other translator elements may be determined by the same rules and proceedings as in well known translating devices with due regard to the requirements of the specific code and system of abbreviations being used, and that the particular interconnections of contacts through the translators shown in the drawing have been simplified to include about the smallest number of contacts and circuit connections required in the present system. Thus in the disclosed translators any one connecting conductor between two symbol identifying contacts usually is included in a plurality of possible circuit paths, each representing a character setting unit, that can be completed by a plurality of other associated contacts. Magnet T is shown in full in a square designated Fig. 10C to represent the recording device or printing device. The other magnets which form a part of the same device are indicated by a letter designation, but not shown in full as they are similar to the T magnet shown. TTK operates in parallel after the proper time interval to allow the printing device to function through PD3. Relay TTK referred to and other similar slow operate relays may be termed delay control elements or means, or timed restoring links. TTK extends the start ground to operate H through TTKI, PWI, HRI, THRI, R3, P5, TB7, PTRI4, to H, not shown in full. THR operates slowly to extend the ground to operate E through THRI, A2, O2, E2, TEUI, U6, A5, O3, TBII, to E. The above circuit just traced represents a character setting link or unit for the character E. The vowel code receiving elements together with their character settings constitute a vowel translating field. TEU operates slowly to extend the start ground to operate RL through TEUI, FRI, PBI, LGI, TSI, DSI, ABCI, PAR2, WMPI, BCI, RL. IRL operates through RL2, IRL, ISTI, PPTRI. Delay is introduced before the operation of SPM to allow the printing device to function. SPM operates through TRKI, SPI, IRL2. RL operates 3RL, Fig. 6B, through 3RL, PPT5, PPT6, RLI, 2RL2. TA and CC release at 3RL2, to advance the tape. ST releases at CCI. 2RL operates through RI, RL2. It operates slowly to allow the space to function. 2RL releases IST at 2RL3 which in turn releases the recording relays and removes the start ground to release RL. 2RL also releases 3RL which in turn operates TA and CC to make the next row effective after IST releases, which it does slowly to allow all recording relays to release. RL releases at IST4, which releases IRL, and it shunts 2RL, which releases slowly to allow the space to function. CC in operating makes contacts for the next row effective to operate SP, T, K, P, W, E, P, L, TK, PW, VWL, PB, LG, L', TLG. The above relays operate in a manner similar to those described except TLG which operates on the right winding through B3, P3, ITB12. This is operated to prevent printing the letter L. ST and STI operate as before. The start ground operates G through DSI, STOPI, IST4, S2, TKI, TTKI, K3 T3, PW4, WI, PPTRI8. TTK operates to extend the start ground to TPW through contacts PWI. TPW operates but B does not operate since the circuit is open at both T4 and P6. TPW extends the ground to E through HRI, A2, O2, E2, TEUI, U6, A5, O3, TBII. TEU operates to extend the ground to M which operates through TEUI, FRI, PBI, TPBI, B4, F3, L4, IPTR6. TPB operates to extend the ground through LGI, TLGI and circuit as described above to operate RL etc. The tape advances as before, but since no words were assumed, no further record is sent to the translator and the apparatus stops.

Various combinations may be translated and typed in a manner similar to those just described and all regular typing is accomplished in this manner. The following table shows a list of combinations which may be used with this circuit. They may best be checked in units, that is, all the initial consonants, then the vowels, then the final consonants.

This list is in addition to the single letter combinations shown in Fig. 6.

Initial consonants

| | | |
|---|---|---|
| ST=ST | SM=SPH | BR=PWR |
| SK=SK | SN=STPH | CL=KHR |
| SW=SW | TH=TH | DR=TKR |
| SH=SH | TR=TR | GL=TKPWHR |
| STR=STR | TW=TW | GR=TKPWR |
| SP=SP | PL=PHR | EX=KP |
| SPR=SPR | PR=PR | BL=PWHR |
| SC=SKR | WH=WH | CH=KH |
| SCH=SKH | WR=WR | QU=KW |
| SQU=SKW | FL=TPHR | GU=TKW |
| SL=SHR | FR=TPR | EB=KPW |

Vowels

| | | |
|---|---|---|
| AI=AEU | IO=AOU | OU=OU |
| AU=AU | OA=AOE | EI=AOEU |
| EA=AE | OI=OEU | |
| EE=OE | OO=AO | |

Final consonants

| | |
|---|---|
| ND=PBD | ST=GT |
| TH=TD | STS=GTS' |
| LL=LT | FE=FTS' |
| NG=PBG | RK=RBG |
| NGE=PBGDS' | RKS=RBGS' |
| VE=BLGDS' | PS=PS |
| ME=PLDS' | RG=RG |
| GH=FPL | RGE=RGTS' |
| CH=FP | SH=FRB |
| NT=PBT | GE=GDS' |
| NTS=PBTS' | WS=FRS |
| RY=RTS | PE=PDS' |
| RS=RS' | FT=FT |
| NY=PBTS | PT=PT |
| LY=LTS | RX=PPG |
| SS=SS' | KS=BGS' |
| SE=SDS' | RLY=RLTS |
| NS=PBS | LS=LS' |
| CT=LGT | LLS=LTS' |
| CTS=LGTS' | SK=FRBG |
| CE=LGDS' | YS=TSS' |
| TE=TDS' | RM=RLP |
| WN=FRPB | RMS=RPLS' |
| GHT=FPLT | MY=PLTS |
| RE=RDS' | MS=PLS' |
| LE=LTS' | NTH=PBTD |
| RN=RPB | BT=BT |
| RT=RT | BLY=BLTS |
| RTS=RTS' | RTH=RTD |
| KE=BGDS' | RL=RL |
| RD=RD | RCE=RLGDS' |
| RLD=RLD | VY=BLGTS |
| NCE=PBLGDS' | RLS=RLS' |
| NE=PBDS' | NCY=PBLGTS |
| CK=FPB | YE=TSDS' |
| CKS=FPBS' | RST=RGT |
| BLE=BLDS' | |

Phrasing and phonetic spelling

A secondary translating device is furnished in addition to the primary translating device, previously described, and is used for storing and translating in part. For economic reasons the circuits are arranged so that they may be common to a plurality of main translating devices. A well-known lockout circuit is provided in order that any primary translating device may gain exclusive access to the secondary tranlating device. Since an attendant may handle four printing machines when operated from tape records, it may be a convenient unit to associate one secondary translating device with four primary translating devices. If desired the secondary translating device may be furnished individually to the primary translating device and become a part of this device.

The record for either of the above is first translated in the primary translator and stored in the secondary translator, where further translation may take place, and finally it is transferred back to the primary translator in syllables in a similar manner to that when the record is transferred from the tape, after which it is printed. This process of transferring the record is very rapid. After the stored record has been completely printed the secondary translator is released and free to be picked up by another primary translator.

For the illustration of the details of phrasing, the expression "in your letter" is selected. The abbreviation used on code printers is N U R L while with the proposed method N R L is used, in order to eliminate the vowel. The latter is just as significant and easier to write. It is written T P H, R, L, in which T P H signifies N. The record is taken from the tape in substantially the same manner as for full spelling, after which the primary translator is delayed until exclusive use of the secondary translator is secured. Since no vowel record is recorded VWL does not operate, in order to steer the circuit to select the secondary translator. Since the VWL relay does not operate, the start lead from relay ST is not transferred to IST but instead a circuit is furnished to PPS to start the selection of the secondary translator. PPS operates through ACI5, VWL2, ST1, ADT1, and locks to resistance R through PPS3. PPT operates through PPS1, right winding of PPT, PPE2. Assuming the secondary translator to be idle, PPE operates through PPE, PPT3, left winding of PPT, PPS1. PPTR and IPPTR operate through PPT1, IC1, PPE1. The primary translator now has exclusive use of the secondary translator. Since PPE is operated the battery for all operating circuits of PPT is removed and hence none can operate. In case two primary translators start for the common secondary translator simultaneously the series circuit at PPT3 allows one to enter at a time, introducing a very slight delay since the holding time is short. Simultaneously with the operation of PPTR, CI also operates through CI, PPT2, IC1, PPE1. This allows VWL to lock to the particular primary translator through VWL1, CI1, IST3. In addition CI cuts in the common recording leads in the secondary translator to the particular circuits of the primary translator involved. PPTR and IPPTR transfer the printing leads from the printing magnets to corresponding memory relays in the secondary translator. The relay designations correspond but are more significant for the fact that they indicate either initial or final consonants, for example, s— etc., indicates a letter key in the initial consonants, while, —s etc., indicates the final consonants. The primary translator is now started to transfer the record N R L to the secondary translator. IST operates through PPTR1. The action of the primary translator is similar to the action previously described up to the contacts of relays PPTR and IPPTR. N— operates through PPTR6; —R operates through IPPTR1, 5G; —L operates through IPPTR12, G6. The above recording relays lock through CI1, to IST3. Since the tape advance lead is transferred at PPT from 3RL to IC, the latter operates by the advance circuit that would ordinarily operate 3RL. IC operates through 2C1, PPT6, RL1, 2RL2. When the circuit is opened 2C operates through IC, 2C, 2C3, PPS2. IC releases PPTR and IPPTR at IC1 to transfer the printing leads back to the printing magnets. IC also operates 3RL through PPT5, IC1, PPE1. This releases TA and CC at 3RL2 to render the regular tape contacts ineffective.

The record is now transferred from the secondary translator, or phrase spelling system, one syllable at a time, to the primary translator and printed, and the secondary translator is released. Switch PP moves off the normal position and takes one step by the operation and release of PPA, the switch stepping on the release of the magnet. PPA operates through PPA2, IPP normal, IC2. Since IG is not operated the switch takes a second step and moves to position 2. PPA2 operates through PPA2, IG1, IPP1, IC2. Since 2G is operated, relay designated IN operates through S—, —L, —B, —S, —H, —V, —G, 4TR2, 2G1, IPP2, IC2. The same grounded circuit makes the contacts of relay IN effective to transfer the record for the word to the primary translator, that is, it causes the operation of EU for I and PB for N and the space relay. The circuits may be traced through the bracket lead to corresponding contacts at relay CI, and through the contacts to corresponding tape contacts which are open because CC is not operated. The leads from the common secondary translator are multipled at the CI contacts where they are individualized to the particular primary translator, the CI relay shown being individual to the primary translator. The action of printing the word IN with the space is similar to the regular action for full spelling, the principal difference being that TA, CC and ST do not operate. 1ST operates in a different manner to start the printing. Relay 4RL which was held operated while the switch was stepping to position 2 releases after the PPA magnet comes to rest. 4RL together with the closing of the off-normal contact, operates 1ST through PPT4, 2C2, 4RL1, ONPP1. The balance of the operation for printing is similar to that previously described. The regular tape advance lead now closes and opens to operate and release PPA to advance to position 3. PPA operates through 2C1, PPT6, RL1, 2RL2. The switch now advances to position 5 by circuits through the back contacts of 3G and 4G etc. The record for the word "your" and space is now transferred to the primary translator similar to the action for the word "in." K W R is recorded for Y. The switch now advances to position 6, where the syllable "let" is transferred and printed, H R being recorded for L, after which the switch advances to position 7, where the syllable "ter" and space are transferred and printed. The switch advances to position 8, where PPS is shunted by a circuit through 1C2, 1PP8 R resistance. The following relays release: PPT, PPE, 3RL, 1C, 2C. The switch advances to normal by a circuit to PPA through PPA2, 2PP8, 1C2. The primary translator may now proceed in the regular way, and the secondary translator is free to be selected.

*Phonetic spelling*

The general action is similar to the phrasing just described. For illustration of the details the word "before" is selected for which the code is B—, —F, which for recording equals PW—, —F. When this record is encountered on the tape, the record is transferred to the primary translator in the regular way. Since no vowels are recorded, relay VWL does not operate and the secondary translator is therefore exclusively selected as in phrasing. The primary translator translates P W to B and causes the operation of the memory relays B— and —F in the secondary translator which locks to 1ST3. The PP switch steps to position 2 as described under "Phrasing." The record for "be" is now transferred from the secondary translator to the primary translator by a circuit through 1C2, 1PP2, 2G1, 4TR2, bracket lead, —L2. R—2, —F2, in parallel —F3, —F4, —F5, bracket lead through corresponding leads to contacts on CI to tape contacts and then to P, W, E relays in the main translator. The action of printing and advancing the switch to position 4 is similar to that described previously. In position 4 the record of the syllable "fore" is now transferred to the primary translator and printed. The circuit may be traced through 1C2, 4G1, 4TR4, W—2, G—2, Y—2, —B2, —T2, H—2, B—2, in parallel B—3 to B—9, inclusive, over the bracket lead to corresponding leads at the contacts of the CI relay through the contacts of the CI relay to corresponding relays in the primary translator. The record sent is T P for F and D S' for E. The primary translator then functions in the usual manner.

The word "believe" is also illustrated since it discloses the method used for three letter codes or more, and also a method of designing around keyboard limitations, that is, in order to allow the keyboard to conform to present methods, four vowel keys only are provided, which furnish only fifteen combinations which may be used for vowel codes. These are not all required for code printers as a less amount of full spelling is used to record in code. With the proposed machine, however, even more than fifteen are needed at least to some extent. The fifteen useful combinations are assigned in the order of importance. It is the purpose of this illustration to show that the circuit need not be limited because of keyboard limitations. The word "believe" is a two syllable word but because of the keyboard limitations would require three strokes to write since the IE vowel combination is not provided in the key combinations. With phonetic spelling, however, the word may be written at one stroke and the code is B—, L—, —V, and for recording is PWHR—PLG. When this record is encountered the secondary translator is exclusively selected as before and the translated record stored on memory relays B—, L—, —V. The relay for the word "believe" then operates through a contact on each of the above relays in series, that is B—3, L—2, —V2. The switch advances to position 2 as explained and passes the record PWE to the primary translator for "be" over the following circuit, 4TR having operated through contact BELIEVE 1: 1C2, 1PP2, 2G1, 4TR2, lead 2' and contacts in parallel BELIEVE 2, 3, 4, over the bracket lead to corresponding leads at the CI relay through the corresponding contacts to operate relays P, W, E, etc., in the primary translator which causes the printing and the advance of the switch to position 5 as before. In position 5 the record for the last syllable "lieve" is transferred from the secondary translator to the primary translator in the form HROEPLGDS—SP—VT. An additional feature is to operate VT (vowel transfer) over contact 15; also that the record OE is substituted for IE since that is the combination required when VT is operated. The circuit may be traced through 1C2, 1PP5, 5G1, 4TR5, lead 5', contacts in parallel BELIEVE 5 to 14, inclusive, over the bracket lead through corresponding contacts to open relays H, R, O, E, P, L, G, D, S, SP, etc., in the secondary translator. As explained VT operates over contact 15. With this method, the second syllable does not require splitting.

With the above method of phrasing and phonetic spelling phrases and words may be added indefinitely, in so far as it is desirable from an operating standpoint, and does not become too expensive.

Due to keyboard limitations there are some remote cases where a syllable must be split and one stroke may not include a vowel, such as a word ending in DS'. Since this combination is used for E it cannot be used for DS', thus leaving S' for the last stroke. No designations are assigned for S' and the circuit is arranged for VWL to operate through —S'1. Other cases similar to this may be taken care of in a similar manner. A key VS is provided so that for any reason it may be operated as a vowel substitute to confine the apparatus to full spelling. For example, this may be useful due to some irregularities in operating. It is thought, however, that in regular operation, the operator may disregard the VS key, and if any action is required, it may be done by the attendant.

With the above, key F may be considered as F or V as with code printers.

The following is a list of phrases and associated designations which are used as an illustration:

| | |
|---|---|
| of the —FT | in your N—R |
| to the T—T | if you will |
| for the F—T | FY—L (GR—L) |
| you will Y—L | have been —FB |
| with the W—T | is not —SE |
| by the Y—T | can be C—B |
| with a W—RB (W—RH) | as the S—T |
| in a N—RB (N—RH) | if you have been |
| to your T—R | FY—FB (GR—FB) |
| you have Y—F | we shall W—LL |
| in your letter N—RL | we are W—R |
| that is TH—G | that the TH—T |
| this letter T—L | and the —NT |
| that is TH—S | to be T—B |
| as to ST— | we can W—K |
| a letter—RLB (—RHL) | all the L—T |
| we have been W—FB | you can Y—K |
| in the N—T | to have T—F |
| we have W—F | is a S—RB (S—RH) |
| it is T—S | your letter —RL |
| will be L—B | will you LY— (YL) |
| to you TY—, (GR) | may be M—B |
| if you FY— | have the H—T |
| from the M—T | about the B—T |
| in your N—R | if you are |
| you are Y—R | FY—R (GR—R) |
| there is R—S | |

The following is a list of words together with the associated codes which are used to illustrate phonetic spelling. They would require more than one stroke each with full spelling.

| | | |
|---|---|---|
| only NY— | commit C—M | enforce —NC |
| every V—RE | women W—N | issue —SH |
| power PR— | differ D—F | return R—T |
| under —ND | during D—G | bitter BR— |
| half H—F | demand D—N | behind B—N |
| city C—T | view V—E | second —CD |
| until N—L | receive R—C | around —RN |
| reason R—S | destroy D—S | before B—F |
| build B—L | moment M—N | order D—R |
| million M—L | appear P—R | between —BT |
| friend F—N | apply P—L | follow FL— |
| almost L—M | duty D—E | number N—B |
| party —PT | suggest SG— | certain C—N |
| regard R—G | seize SZ—. | person P—S |
| success S—C | over V—R | remember R—M |
| talk T—K | upon P—N | supply SP— |
| transport T—P | also —LS | complete C—P |
| contract C—R | report R—P | value V—L |
| admit D—M | service SV— | help H—P |
| hero H—R | side —SD | perfect P—F |
| into —NT | permit P—M | recent —RC |
| country —CT | special SL— | simple S—P |
| believe BL—V | morning M—G | seven SN— |
| because —BC | subject SJ— | collect CL— |
| purpose —PS | office F—C | add —D |
| ever VR— | ago G— | decide D—C |

The following is a list of words with the codes which may be recorded by a single stroke of a letter key or a code combination for a letter. They are the words represented by a relay at the end of the chain, one for each letter.

Initial consonants:
is S  to T  if F  ago G  port P  about B  with W  in N  you Y  can C  from M  vice V  have H  will W  there R Final consonants:
of F  your R  press P  and N  be B  most M  letter L  can K  it G  shall LL  the T  is S  add D  not E

Addresses

Frequently used addresses or formulas may be recorded and stored on an auxiliary tape, preferably on tough paper or thin metal tape, to insure longer wear. Each address to be used may be located on a different auxiliary controller and set in the start position awaiting the operation of the cut-in and advance magnet to make the contacts effective. The address machines are also made common for economic reasons. It is assumed that the machine for a particular address, such as address R, is to be used. A business letter to this particular address is placed in position on the primary controlling device and the start key operated. TA and CC operate through 3RL2. CC closes the contacts AD and R, or discriminating code contacts, the AD contact operates ADT, and the R contact operates AT through ADT3, AT (left) AE2. R may operate momentarily but no locking circuit is provided because the circuit to ST and IST are opened at ADT1. AE operates through AT2 and AT (right). AE2 delays other translator circuits which may be trying to gain access to the same address machine, thus gaining exclusive access to the address machine. ACI operates through AT1, AE1. 3RL operates through ACI4, ARL2. TA and CC release to advance the primary controlling device and make the contacts ineffective, and release ADT, to make relays ST and IST effective. ATA and ACC operate through ATC1, ACI3. This makes the address tape contacts effective, such as R, Fig. 3B, for example. It is connected in parallel with the main R contact through ACI1. All other contacts are connected through similar contacts on ACI to individualize for the particular main translator. The record for the first row of the address tape may now be transferred to the primary translator, and caused to be printed in a manner similar to regular operation. The tape advance circuit is transferred at ACI2. ATC operates through ACI2, RL1, 2RL2. ATA and ACC release at ATC1 to advance the tape to the second position. The opening of the advance circuit releases ATC to reoperate ATA through ATC1, ACI3. By means of similar operations the address is transferred row by row to the primary translator and caused to be printed. After the tape is advanced to the position beyond the complete address, a second auxiliary discriminating code ARL is encountered which operates relay ARL. AE and AT release at ARL1. 3RL releases at ARL2. TA operates at 3RL2, to make the primary tape contacts effective. ATC operates through ARL2. ATA and ACC release at ATC1, to advance the address tape to position 1 or the starting point, the tape being endless. The contacts are rendered ineffective to release ARL which releases ATC.

Automatic carriage return

The system is arranged to provide an automatic advance at the end of a line, and if no action to the contrary has been taken by the operator, the device will automatically split the word and insert a hyphen and then start a new line. In order to prevent hyphens being inserted in undesired places, it is necessary for the operator to split words in syllables in so far as possible. There are some remote cases, however, where this is not possible due to certain keyboard limitations. Provision is made to cancel this effect and will be described later.

A contact IBC is provided which closes at the time the typewriter bell rings. An off-normal contact ON is also provided which is closed when the typewriter carriage is moved off normal, that is in any position except the beginning of the line. When the carriage has advanced to the point where IBC is operated, then BC operates through IBCI, ABCI, WMI. It locks through BC2, ONI. In case the space relay had been operated, CR would operate through SP3, CSSI, BCI, etc., the start lead being intercepted at BCI. The carriage returns to normal and releases BC at ONI. This transfers the start lead to operate RL as previously described. In case the space relay had not been operated, HYP would operate through SP3, CSSI, BCI. HYP prints a hyphen and it also operates the carriage return magnet through BC2, HYPI. In cases where the operator desires to insert a hyphen it may be done by the proper operation of the keys required, but in this case, however, it will not operate the carriage return magnet as it would be open at BC2. The carriage may be returned from any point by the operation of the CR combination. Subsequent operations cause the carriage to move to a new line space.

*Paragraph*

When the paragraph combination is encountered, that is S' together with bar TB, relay PAR operates over lead PAR to contacts and ITBII. PAR intercepts the start lead at PAR2, and the circuit that would operate RL is transferred to operate magnet CR through ON2, PAR2. The carriage returns from any point it may be on and returns contact ON2 to normal. TAB now operates over ON2, PAR2, start ground. This moves the carriage to the first tabular, or paragraph, position.

*Numerals*

The numerals are assigned similar to the assignment on the code printer as shown on Fig. 7C. For example, to print "4" the TB and H keys are operated. The translator attempts to print the letter H but since the printing lead is transferred to the 4 magnet at TB7 the numeral 4 is printed instead. To print "1" the S lead is transferred to the L magnet at LTBI, as the small L is used for "1" (numeral) on standard typewriters. Other combinations are shown on Fig. 7C.

*Miscellaneous*

Since the numerals on standard typewriters are permanently associated with certain miscellaneous characters, it appears logical to obtain them by the associated numeral combination plus the upper case combination. For example, the dollar sign ($) is permanently associated with the digit "4", the per cent sign (%) with the digit "5", etc., on a standard typewriter keyboard as shown in Fig. 7E. It appears logical to obtain the dollar sign ($) by operating the combination for "4" together with the upper case combination, instead of some complicated combination now used in code printers. The combination therefore is TB, H, VS.

*Begin capital*

In order to keep the operating uniform it is very desirable that the words may always be written in the same manner, for example, in case the word begins with a capital, the latter record may be recorded in advance and then the word written as usual. The first letter will print as a capital and shift back to the lower case and the other letters will print in that way. When the combination for "begin capital" is encountered, that is, B, TB, the SH relay operates over lead SH, ITB4, similar to any letter combination. SH locks through SH2, resistance RI. PD operates through SHI. Any word or syllable may now be encountered by the tape contacts such as THE. The translator functions to print T in the usual manner, and a ground on the start lead also operates RBC through ITB7, IPPTRI8, PD3. It operates slowly and shunts SH slowly to allow time for the first letter to print properly before the carriage starts to release. The carriage now releases from the shift position, after which the PD relay releases slowly to allow the carriage to release and get perfectly settled before the printing is allowed to proceed. The battery feed leads to the timing relays have been held open at PDI, 2 and 3. After the capital T was printed TTK could not operate to cut through to the H letter until PD had released. The rest of the operation is regular.

*All capitals*

The SH relay may be operated and locked by the combination E, RTB. Relay SH operates through LTBII, lead SL joins SL at SL relay. It locks through R2, SL, SL2. SHM operates through SLI. All capitals may now be written in the regular way. SL may be released by the operation of U, RTB. SL is shunted by the UNL lead which joins UNL at LTBI3.

*Punctuation*

For example a comma is printed by keys G, TB. If the shift combination is operated simultaneously the upper case will print a question mark. Similarly other combinations may be obtained.

*Double letters*

Double "o" (OO) or "e" (EE) are controlled by TOE which is slow to operate to allow the magnet and machine to completely restore before the second pulse is started. Similarly TLS is provided for LL and SS.

*Special combinations*

Period, space, begin capital, and carriage return or paragraph may be operated at one stroke in any appropriate combination such as period and space, period space and begin capital, period, begin capital and carriage return, period, begin capital and paragraph. Similarly combinations including the comma or question mark may also be used.

*Changes in tape record*

Operators are usually very accurate on this type of keyboard and it is thought that very few corrections will be necessary. All operators, however, will make some mistakes and provision is made for changes. Some changes will be necessary because of the dictator such as cancellations and insertions, and provision is made to not impose any limitations on the part of the dictator. The operator in taking dictation may indicate any changes in pencil as is done at present. An attendant later makes any necessary changes on a secondary perforator which is similar to the primary recording device and is shown in Fig. 7F. The secondary machine is arranged for punching holes at one edge of the tape to automatically makes the necessary changes. The keyboard is shown in Fig. 7D. The tape is placed over a metallic cylinder as in Fig. 7F. The embossed punchings in the tape are fitted on the cylinder to insure punching at the right location. The tape may be rotated to the proper point by a blank key TA, Fig. 7D, which does not record. If desired for long jumps the cylinder may be rotated at rather high speeds by a magnet operating continuously through its own back contact until the circuit is opened. This magnet would control a ratchet for rotating the cylinder to a point preceding the change, and the exact point reached by the operation of the STA key (secondary tape advance). Another alternative for very long jumps would be to remove the tape from the cylinder and replace it on the cylinder at a point just preceding the change and rotate by means of the STA key to the proper row.

The secondary perforator provides eight keys for punching combinations of holes in the eight positions at the right-hand side of the tape. The A', B' and C' keys are used for the smaller changes as follows:

A'=Begin capital.  B'=Insert back space.
C'=Stop printing.  A'B'=Insert paragraph.
A'C'=Insert comma.  B'C'=Insert period.
A'B'C'=Cancel split syllable.

The above combinations are not limited to three lows as four rows would furnish fifteen combinations and five rows would furnish thirty-one.

An alternative plan for corrections is to punch a stop combination opposite the row before the place where the correction starts and allow the attendant to fill in the correction on the typewriter keyboard for corrections such as small insertions which may not have been recorded on the original tape. The attendant will probably select the method according to the extent of corrections.

*Inserting a period*

For illustration, in case a period is omitted and is to be inserted, a hole is punched with keys B' and C' opposite the row which the period is to follow. In printing, this causes the operation of relays B' and C' and also ABC which intercept the start lead at that point momentarily to cause the operation of the period magnet through ABCI, TMI, A'I, B'I, C'2. TM also operates to reclose the start ground for regular operation through TMI. The action of inserting a comma is similar.

*Inserting a paragraph*

In inserting a paragraph, it is assumed that the last stroke was a period, space and begin capital. Holes are punched opposite the same row by keys A' and B'. In printing, after the above have been recorded the start ground is again intercepted and the paragraph relay operated through contacts ABCI, TMI, A'I, B'3, C'4, WMC, PAR. It locks to TAB2. TM operates as before to connect the start lead through but it is again intercepted at the PAR relay. The carriage now moves to the paragraph position as previously described, after which relay PAR releases to cut the start lead through for releasing except for SH and SHM which remain operated for begin capital, the action of which was described.

*Cancel split syllable*

As previously mentioned, if a word is split at a point other than at the end of a syllable, and at the same time it happens at the end of a line, a hyphen would be inserted and the carriage returned unless some action is taken to prevent it. This is remote but can happen. Provision is made to delay the carriage return until the end of the syllable. This may be determined by a proof copy, and if required holes could be punched by keys A', B' and C' opposite the partly recorded syllable. As previously described at the end of a line, BC operates to transfer the start lead to HYP or CR depending on the position of SP3 contact. The operation of A', B', C' and ABC intercept the start lead to operate CSS through ABCI, TMI, A'I, B'3, C'4. CSS transfers the start ground from HYP or CR back to the regular releasing circuit at CSSI, and postpones carriage return until the end of the syllable.

The stop circuit is associated with other combinations and will be described under the following heading.

*Cancellations and insertions*

Fig. 8D shows the necessary perforations for one cancellation and two insertions. The general action is to skip three rows, print two rows, advance the tape without printing to insert "A", print insert "A", step the tape backward without printing to the point following insert "A", print seven rows, advance the tape without printing to insert "B", print insert "B", step the tape backward without printing to the point following insert "B", print nine rows and stop the action at the end of the letter. The first hole encountered is at the top of the figure in row D' which operates SR through TR3, ISR2, SR, RI, and it locks through SR2, PRI, ECI. CC releases at SR4, to render the start and tape contacts ineffective. The opening of the start contact CCI takes place and releases ST before IST has had time to operate. This prevents a ground from being placed on the start lead at IST4, and also prevents a ground from being placed on the locking circuit at IST3. The momentary record of the first row to be skipped therefore is released as soon as CC operates. ISR is shunted and does not operate. The tape is advanced in steps by the continued operation and release of 3RL through 3RLI, IPR2, SRI. This causes the continued release and operation of TA at 3RL2, to advance the tape past the cancellation. When the first row to be printed is reached, a record is taken from row H' which operates EC. SR releases at ECI and prevents further tape advance. CC again operates through SR4, 3RL2, SK, IPRI, to make the contacts effective and the regular printing is resumed. EC releases when contact H' is opened. When the first row to be skipped is reached a perforation in row D' is encountered which operates the SR relay as previously traced, and it causes the tape advance as before to the beginning of insert "A". In passing the perforation at F' the contact does not get a complete circuit since it is open at TR3. At the first row of insert "A", a perforation at E' is encountered which operates PR through TRI, and it locks through PR2, ISR3. IPR operates through PRI, ECI. SR releases at PRI. CC operates at SR4 to make the tape contacts effective, and insert "A" is then printed in the regular manner. In the row past insert "A" a perforation at contact D' operates SR as before and it releases CC at SR4 to prevent the contact feelers from interfering with the tape recede which now takes place in steps by the continued operation and release of TRC through TRC1, IPR2, SR1. The tape contact G' is open at TR1. The tape is stepped backward and when contact D' opens, it removes a shunt from ISR and it operates in parallel with R1 through SR, ISR lower, SR3, IPR1. PR releases at ISR3, and locks SR and ISR through ISR upper and R1 in parallel, SR, SR2, PR1, EC1. IPR releases at PR1. When the tape has receded to a point which is to follow insert "A" contact D' is again closed to hold ISR through TR3, ISR2, ISR upper. The same circuit shunts down SR. TR operates through ISR1, SR1. It locks through TR2, STOP2, RL1. The release of SR operates CC to make the contacts effective to start the regular printing. As the tape is advanced D' opens to release ISR. Insert "B" is made in a similar manner but since TR is operated the control relays are transferred to F' and G' which now do the controlling. That is, perforation F' advances the tape to print insert "B" and perforation F' recedes the tape to the row which is to follow insert "B" where another perforation F' causes the regular printing which follows insert "B", after which a blank row is encountered to stop the printing at the end of the letter, and this calls the attention of the attendant.

End of page

A line counter switch is shown for double spacing. This switch is well known in machine switching systems. It steps to the next set of terminals when the magnet releases. Any number of points may be provided and connected so that when the end of a page is reached it opens the ground feed for the contacts and prevents further records from entering the translator. This causes the machine to stop to call the attention of the attendant that a new page should be inserted. The DLCM gets a circuit at the end of each line to take one step. It is in parallel with CR. In cases where the transcription does not complete a page the attendant's attention is called since the machine stops. The attendant may then cause the switch to return to normal or the beginning of the new page by holding the DLCK operated which causes the continued operation and release of DLCM through DLCM1, LCON, DLCK. The page lamp lights to indicate the normal position after which the key may be released. The lamp lights through LCON, DLCK.

Direct keyboard operation

The apparatus and circuits may be operated from a keyboard direct by using the key contacts shown in Fig. 10A instead of the tape contacts shown in Fig. 10B. The keyboard is arranged as shown in Fig. 7F and designed similar to the code perforator less the cylinder, toothed wheel, pawl and template. The operation of the contact is shown in Fig. 12, in which a contact is controlled by each key lever. The keyboard is arranged as shown in Fig. 7A.

For operation using a direct keyboard the start key is placed in a normal position thus preventing the operation of CC and TA. The operation of the keys in the direct keyboard closes a contact for each key, similar in effect to the action of the tape contacts. In addition, a common start contact 17 is provided which corresponds to CC1, and operates ST in a manner similar to the action of the common contact CC1. The balance of the operation is substantially the same as that previously described.

Factor of operating

This study was made from one sample of a business letter of 171 words and it gives the following indication: It is based on a stroke of one or more keys as a unit of work time and it so happens that the time required for the operation of a plurality of keys on a permutation keyboard is approximately the same as that required for one typewriter key. The expert operators appear to agree that with the proposed plan which requires an average of one half a key more per stroke than with the code printer, very little difference in the time required will be made. With the code printer, to produce in code, the above letter requires 233 strokes or 1.36 strokes per word and 3.40 keys per stroke average. To transcribe requires 5.6 strokes per word plus .5 for carriage returns plus 1.36 to reproduce in code, making a total of 7.46 as a factor of operating to reproduce in completed form.

In the proposed plan in using full spelling alone it requires 1.64 strokes per word and 4.43 keys per stroke. Since the phrasing and phonetic spelling are not used extensively, they may be considered as giving the following indication as to what may be expected after the proper engineering effort is exerted.

For phrasing in addition to the full spelling 1.54 strokes per word are required with 4.14 keys per word average.

For phonetic spelling in addition to full spelling and phrasing it requires 1.52 strokes and 4.04 keys per stroke average.

Assuming that an attendant can operate four printing machines as is now done with similar machines, it would require one fourth of an operator's time as say 50% of the salary of the operator taking dictation. The two types of machines would probably operate at about the same average speed. This would give a figure of .2 to be added to the above figures making the following figures for the three plans respectively, 1.84, 1.74 and 1.72 as against 7.46 for the present method to produce in completed form.

Another gain which is not figured above is that a finished letter that is to have changes, must be entirely rewritten on a standard typewriter with present methods. But where the record with the proposed method is on tape, changes or additions may easily be made on the tape and a complete new copy printed automatically.

Speed of operation

Operators using code printers now operate at various speeds from 100 to 300 words per minute. I know one expert who claims to be able to operate at 350 words per minute. Removing the experts, it leaves average operating at say 100 to 200 words per minute or 150 words per minute average. Since the proposed method in the present state of development requires about 12% more strokes, it appears that the average of the average operator would be about 130 words per minute. This, however, takes into consideration only the circuits in their present state of development. It is thought that with the proper development of the proposed method, that operation may be made sufficiently efficient to equal or even surpass the code printer for producing a record in code.

Wide margins

The object is to present a neater appearance on short letters by leaving a wider margin than usual on each side of the letter. Before printing operations, the WM key is operated and locks, the general effect of which is to change all carriage return operations into paragraph operations and all paragraph positions into the second tabular positions. It also provides a wide-margin contact for increasing the right-hand margin of the page. It corresponds to the bell contact for regular printing and may be placed in any desired position previous to the closing of the bell contact. Its effect is to return the carriage at an earlier point. The attendant may now place the paper in the proper position for printing. Regular printing may now take place until WMC is reached. PAR operates through WMC, WMI. Printing continues to complete the record in the primary translator. The operation is now the same as the paragraph action previously described. This brings the carriage to the beginning of the line for wide margin operation. When the paragraph combination is encountered at any point in the line, PAR operates as previously described. WMP also operates through WM2 in parallel with PAR. WMP locks through WMP2, TAB1. PAR locks through PAR3, TAB2. The carriage moves to the beginning of the wide margin line as previously described. WPM does not release when TAB operates as it locks through WMP2, PAR1. PAR is made slow to release to insure that WMP remains operated until TAB releases at ON2. DLT operates through WMP1. TAB operates through DLT1. The carriage now moves to the second tabular position or paragraph position for wide margins. WMP releases at TAB1. DLT releases at WMP1. The regular release now takes place.

Routine tests

It is thought that very little routine testing will be necessary since this type of apparatus is subject to a very small amount of trouble. If desirable, a tape machine could be provided similar to the address machine with an endless tape having recorded on it sentences selected to check all the contacts. This record could be printed in the morning before starting operations.

While I have described what I consider, at present, the preferred embodiment of my invention, it will be obvious to those skilled in the art that various changes and modifications may be made without departing from the spirit of the invention and I therefore aim in the appended claims to cover all such changes and modifications as fall within the true spirit and scope of my invention.

What is claimed is:

1. A translating system comprising a plurality of code receiving units each having a group of two-position symbol identifying means, a plurality of character setting means adapted to be selectively responsive to the setting of two or more of said groups of symbol identifying means in their alternate positions to complete the translation of a received code by the selection of a group of one, two or more of said character setting means, a printing device having a plurality of character recording elements representing letters, numerals and signs of the alphabet, a plurality of sequence control links normally serially connected and each alternately connected to condition one of said character setting means for printing control, said sequence control links being arranged in the order of the desired order of printing for said selected character setting means in said selected group and each being connected to be operative into its alternate connection, in response to a received code, each of said character recording elements being responsive to one of said conditioned character setting means, and timed advancing means connected for timing the sequential operation of successive sequence control links at predetermined intervals for advancing the printing control.

2. A translating system comprising a plurality of code receiving units each having a group of two-position symbol identifying means, a plurality of character setting means adapted to be selectively responsive to the setting of two or more of said groups of symbol identifying means in their alternate positions to complete the translation of a received code by the selection of a group of one, two or more character setting means, a printing device having a plurality of character printing elements including letters, numerals, and signs of the alphabet for printing one at a time, a plurality of sequence control links normally establishing a series connection for advancing the printing control to said character setting means and each alternately connected to a predetermined group of two or more of said character setting means to condition said group of character setting means for printing control and to open said series connection, said control links being ordered in their serial connection in accordance with the predetermined order of printing of the characters of said selected group of character setting means and each being connected to be operative into its alternate connection together with operation of either one of two of said code receiving units in response to a received code, each of said character printing elements being controllable by one of said conditioned character setting means for printing a character and only one of the character setting means included in one of said predetermined groups being selectable at any one time by said groups of symbol identifying means, and timed advancing means connected for closing the said series connection a predetermined time after it has been opened by one of said sequence control links.

3. A translating system in accordance with claim 1 in which said timed advancing means comprises a plurality of timed advancing links, each connected with one of said sequence control links and controlled thereby and timed to restore the said series connection at the associated sequence control link for advancing the printing control to a succeeding character setting means shortly after the completion of the printing of a character under control of the character setting means conditioned by the associated sequence control link.

4. A decoding system comprising a record tape having mechanical impressions representing successive records in code, each record representing one, two or more characters, a tape advancing device adapted for testing successive records on said tape, a translating system connected to be responsive to the tests by said tape advancing device for translating said coded records into character settings within said translating system, a printing device connected to be responsive to said character settings to print letters, numerals and signs of the alphabet, said translating system including a group of two-condition translator elements connected for receiving test settings from said tape advancing device and a group of two-condition character setting units for converting said test settings into said character settings and connected for control of said printing device, and a sequence chain arrangement for advancing in predetermined sequence the control of said printing device to successive ones of said character setting units and including a plurality of sequence switching links for opening and closing a series chain of said switching links and a plurality of timed restoring links paired with said sequence switching links to reclose said series chain over a multiple path when opened by the paired switching links, said sequence switching links being connected to be responsive to the test settings of said translator elements for opening of said chain and switching the printing control to an associated character setting unit and said restoring links being connected to be responsive to closing of said series chain at a preceding point to close said multiple path after a predetermined time to allow for completion of the printing operation controlled over its paired sequence switching link.

5. A decoding system comprising a record tape having mechanical impressions representing successive records in code, each record representing one, two or more characters, a tape advancing device adapted for testing successive records on said tape, a translating system connected to be responsive to the tests by said tape advancing device for translating said code records into character settings within said translating system, a phrase spelling system connected to be responsive to the tests by said tape advancing device for translating said code records into syllable settings representing words or syllables, a printing device connected to be responsive to said character settings to print letters, numerals and signs of the alphabet, the records on said tape including vowel impressions representing vowels and consonant impressions representing consonants, signs, and numerals of the alphabet, said translating system including a character translating group of two-position translator elements and character setting units, said translator elements being connected for receiving test settings from said vowel and conconant impressions and converting them into character settings of said character setting units for control of said printing device, said phrase spelling system including a phrase translating group of two-position translator elements and syllable setting units, said translator elements being connected for receiving test settings from said consonant impressions only and converting them into syllable settings of said syllable setting units for control of said printing device, and code discriminating means connected to be responsive to the test by said tape advancing device for any one of said vowel impressions to render said phrase spelling system responsive to the tests by said tape advancing device of said consonant impressions, when any one of said successive code records includes consonant impressions only.

6. A decoding system comprising a plurality of vowel code receiving units responsive to vowel code symbol impressions in a record representing vowels, a plurality of consonant code receiving units responsive to consonant code symbol impressions representing consonants, signs and numerals of the alphabet, a vowel translating group of two-position translator elements adapted to be responsive to said vowel code receiving units for converting the vowel code symbols into vowel character settings of its said elements, a consonant translating group of two-position translator elements adapted to be responsive to said consonant code receiving units for converting the consonant code symbols into consonant character settings of its said elements, a phrase translating group of two-position translator elements adapted to be responsive to said consonant code receiving units for converting the consonant code symbols into predetermined groups of vowel and consonant character settings of its said elements representing words and syllables, and vowel discriminating means including a vowel responsive unit connected to be responsive to said vowel code symbol impressions to prevent said phrase translating group from converting, the translator elements of said translating groups each comprising a plurality of symbol identifying means arranged in different combinations on different said elements in accordance with the requirements of the code for producing said character settings.

7. A decoding system comprising a plurality of vowel code receiving units responsive to vowel code symbol impressions in a record representing vowels, a plurality of consonant code receiving units responsive to consonant code symbol impressions in the record representing consonants of the alphabet, a vowel translating system of translator elements adapted to be simultaneously responsive to one or more of said vowel code receiving units for converting the vowel code symbols into vowel character settings of said translator elements, a consonant translating system of translator elements adapted to be simultaneously responsive to a plurality of said consonant code receiving units for converting the consonant code symbols into consonant character settings of said translator elements, a phrase translating system of translator elements adapted to be simultaneously responsive to a plurality of said consonant code receiving units for converting the consonant code symbols into a plurality of predetermined groups of vowel and consonant character settings of said translator elements representing words and syllables, vowel discriminating means including a vowel responsive unit connected to be responsive to any one or more of the vowel code symbols to prevent the converting action of said phrase translating system in the presence of a vowel code symbol in said record, a printing device having a plurality of character printing elements including vowels and consonants of the alphabet for printing one at a time, each of said translating systems comprising a plurality of symbol identifying means arranged in different combinations for different translator elements in accordance with the requirements of the code for producing said character settings, a plurality of character setting units adapted to be selectively responsive to said character settings each for operation of a corresponding one of said printing elements, a printing sequence control system including a plurality of switching links normally in series connection and each connected to be operative together with one or more of said code receiving units for control of the printing operations of said character printing elements in a predetermined sequence, said switching links being operative into normal and alternate positions for switching the control of said character printing elements by said translating systems along the said series connection to any point corresponding to the next succeeding character to be printed, and timed advancing means connected for automatically restoring said series connection a predetermined time after it has been opened by one of said switching links.

8. A translating and recording system comprising a record tape having a plurality of record spaces arranged successively along said tape, a code record in each of said spaces arranged across said tape and comprising a plurality of mechanical impressions representing one, two or more characters, a tape advancing device having means for advancing said tape to present said spaces in succession for simultaneous testing of the said code impressions and having a plurality of testing elements each operative into alternate positions in response to the presence and absence of a code impression, a translating system having a plurality of code receiving units, translator elements and character setting units interrelated in accordance with code requirements and connected for translating the simultaneous code tests by said tape advancing device into one, two or more character settings of said translator elements for selection of corresponding character setting units, sequence control means including a series of switching links connected to be responsive to the simultaneous code tests by said tape advancing device to render said selective character setting units operative one at a time and in sequence as determined by the code record, and a printing device having a plurality of character printing elements connected to be responsive to certain of said operative character setting units for recording of characters and having a plurality of function elements connected to be responsive to others of said operative character setting units for modifying the printing of characters and for effecting functional operations of the printing device, said function elements including case operating means for alternatingly effecting shift to upper case and unshift to lower case.

9. A translating and recording system comprising a record tape having a plurality of record spaces arranged successively along said tape, a code record in each of said spaces arranged across said tape and comprising a plurality of mechanical impressions representing one, two or more characters, a tape advancing device having means for advancing said tape to present said spaces in succession for simultaneous testing of the said code impressions and having a plurality of testing elements each operative into alternate positions in response to the presence and absence of a code impression, a translating system having a plurality of code receiving units, translator elements and character setting units interrelated in accordance with code requirements and connected for translating the simultaneous code tests by said tape advancing device into one, two or more character settings of said translator elements for selection of corresponding character setting units, sequence control means including a series of switching links connected to be responsive to the simultaneous code tests by said tape advancing device to render said selected character setting units operative one at a time and in sequence as determined by the code record, and a printing device having a plurality of character printing elements connected to be responsive to certain of said operative character setting units for recording of characters and having a plurality of function elements including case operating means connected to be responsive to others of said operative character setting units for modifying the printing of characters and for effecting functional operations of the printing device, said translating and recording system further including common unshift control means connected to be responsive to the selection of any one of a plurality of predetermined character setting units for controlling the operation of the case operating means for unshift of said printing device and also including unshift sequence control means connected for delaying the unshift operation of the case operating means until after the operation of the character printing element in response to the associated predetermined character setting unit.

10. A translating and recording system comprising a record tape having a plurality of record spaces arranged successively along said tape, a code record in each of said spaces arranged across said tape and comprising a plurality of mechanical impressions representing one, two or more characters, a tape advancing device having means for advancing said tape to present said spaces in succession for simultaneous testing of the said code impressions and having a plurality of testing elements each operative into alternate positions in response to the presence and absence of a code impression, a translating system having a plurality of code receiving units, translator units and character setting units interrelated in accordance with code requirements for translating the simultaneous code tests by said tape advancing device into one, two or more character settings of said translator units for selection of corresponding character setting units, sequence control means including a series of switching links connected to be responsive to the simultaneous code tests by said tape advancing device to render said selected character setting units operative one at a time and in sequence as determined by the code record, and a printing device having a plurality of character printing elements connected to be responsive to certain of said operative character setting units for recording of characters and having a plurality of function elements connected to be responsive to others of said operative character setting units for modifying the printing of characters and for effecting functional operations of the printing device, said printing device including as function elements case operating means for alternatingly effecting shift to upper case and unshift to lower case, said translating system including among said receiving and setting units predetermined units connected to be responsive to a first predetermined code record to produce a first character setting for operating said case operating means for shift, predetermined units connected to be responsive to a second predetermined code record to produce a second character setting for operating said case operating means for shift, and predetermined units connected to be responsive to a third predetermined code record to produce a third character setting for cooperation with said first character setting to operate said case operating means for unshift, said translating and recording system further including common unshift means connected to be responsive to any one of a plurality of predetermined character settings and adapted for cooperation with said second character setting to operate said case operating means for unshift of said printing device in addition to the operation of the character printing element in response to the associated predetermined character setting of said plurality.

11. A translating and recording system in accordance with claim 10 further comprising first shift locking means connected to be responsive to said first predetermined code record to retain said case operating means in shift position and to be responsive to said third character setting for restoring said case operating means to unshift position, and second shift locking means connected to be responsive to said second predetermined code record to retain said case operating means in shift position and to be responsive to said common unshift means for restoring said case operating means to unshift position.

12. A translating and recording system comprising a record tape having a plurality of record spaces arranged successively along said tape, a code record in each of said spaces arranged across said tape and comprising a plurality of mechanical impressions representing one, two or more characters, a tape advancing device having means for advancing said tape to present said spaces in succession for simultaneous testing of the said code impressions and having a plurality of testing elements each operative into alternate positions in response to the presence and absence of a code impression, a translating system having a plurality of code receiving units, translator units and character setting units interrelated in accordance with code requirements for translating the simultaneous code tests by said tape advancing device into one, two or more character settings of said translator units for selection of corresponding character setting units, sequence control means including a series of switching links connected to be responsive to the simultaneous code tests by said tape advancing device to render said selected character setting units operative one at a time and in sequence as determined by the code record, and a printing device having a plurality of character printing elements connected to be responsive to said operative character setting units for recording of characters and having a plurality of function elements responsive to said operative character setting units for modifying the printing of characters and for effecting functional operations of the printing device, said printing device including as function elements case operating means for alternatingly effecting shift to upper case and unshift to lower case, said translating system including among said receiving and setting units predetermined units connected to be responsive to a first predetermined code record to produce a first character setting for operating said case operating means for shift, predetermined units connected to be responsive to a second predetermined code record to produce a second character setting for operating said case operating means for shift, and predetermined units connected to be responsive to a third predetermined code record to produce a third character setting, said translating and recording system further including first shift locking means connected to be responsive to said first predetermined code record to retain said case operating means in shift position and to be subsequently responsive to said third character setting for restoring said case operating means to unshift position, second shift locking means connected to be responsive to said second predetermined code record to retain said case operating means in shift position, common unshift means connected to be responsive to any one of a plurality of other predetermined character settings for operating said second shift locking means to sequentially restore said case operating means to unshift position, and unshift sequence control means connected for delaying the said restoring operation by said second shift locking means until after the operation of the character printing element in response to the associated said predetermined character setting.

13. A recording and translating system comprising a record tape having a plurality of transverse record spaces forming a substantially smooth surface, a code record in each of said spaces comprised of one or more mechanical impressions in said tape, a tape advancing device having rotary means for receiving and advancing said record tape and including a plurality of selective test elements adapted to be simultaneously responsive to the presence and absence of said impressions in a record space each to be operated into alternate positions, a translating device having a plurality of code receiving units connected to be responsive to said test elements, said units having movable translation selectors in various combinations in accordance with the requirements of the code to produce character settings corresponding to said code records, said translating device also having a plurality of character setting elements adapted to be selectively responsive to said character settings, and a recording device having a plurality of character printing elements connected for printing of characters each under control by one of said character settings through said selected character setting elements, two or more of said code receiving units being simultaneously responsive to one of a first group of said test elements for producing corresponding two or more different character settings, and others of said code receiving units being responsive simultaneously with said two or more units to any one of a second group of said test elements and connected to selectively determine which of said two or more different character settings shall be effective in controlling corresponding printing operations and to render the remaining character settings controlless.

14. A recording and translating system comprising a record tape having a plurality of successive record spaces, a code record in one of said spaces comprised of at least one mechanical impression representing a principal code and at least one other mechanical impression representing an auxiliary code, a tape advancing device having means for receiving and advancing said record tape and having a plurality of selective test elements for simultaneous testing of the impressions in each of said successive record spaces, a translating device including a plurality of code receiving units connected to be responsive to said tests and having two-position translation selectors in various combinations in accordance with the code to produce character settings among said selectors corresponding to said code records, and a recording device having a plurality of character printing elements connected for selective operation under control of corresponding character settings, said translating device having at least two of said code receiving units responsive to one of said principal code impressions through said tape advancing device to produce two different character settings, and having still another code receiving unit responsive to one of said auxiliary code impressions through said tape advancing device to select one of said two different character settings for control of one of said printing elements and to exclude the other of said charatcer settings from printing control.

15. A translating and recording system which comprises a record tape having primary punchings representing a code message to be translated for printing and having secondary punchings at spaced intervals along said tape and representing different predetermined deviations from a continuous printing of said code message, a tape advancing device comprising a rotary element for receiving said tape, driving means for rotating said element to move said tape forward and backward, and a plurality of two-position test elements adapted to be intermittently responsive to the presence and absence of punchings in said tape, a translating device having a plurality of code receiving units connected to be responsive to said test elements and a translating group of translator elements controlled by said receiving units for decoding said tests in accordance with the requirements of the code for producing corresponding character settings of said translator elements in accordance with said primary punchings and corresponding functional settings of said translator elements in accordance with said secondary punchings, and a printing device responsive to said character settings to print corresponding characters, said driving means being connected to respond to one of said functional settings for continually moving said tape forward and to another of said functional settings for continually moving said tape backward.

16. A translating and recording system in accordance with claim 15 which further comprises skipping means connected to be responsive to said one and other functional settings to prevent operation of said printing device in accordance with records in the tape being tested during the said continual forward and backward movements of the tape.

EDGAR H. CLARK.